(12) United States Patent
Nishizawa et al.

(10) Patent No.: US 11,809,699 B2
(45) Date of Patent: Nov. 7, 2023

(54) OPERATION SETTING DEVICE AND INJECTION MOLDING MACHINE

(71) Applicant: NISSEI PLASTIC INDUSTRIAL CO., LTD., Nagano (JP)

(72) Inventors: Chiharu Nishizawa, Nagano (JP); Syuto Tanaka, Nagano (JP)

(73) Assignee: NISSEI PLASTIC INDUSTRIAL CO., LTD., Nagano (JP)

( * ) Notice: Subject to any disclaimer, the term of this patent is extended or adjusted under 35 U.S.C. 154(b) by 0 days.

(21) Appl. No.: 17/600,718

(22) PCT Filed: Mar. 5, 2020

(86) PCT No.: PCT/JP2020/009429
§ 371 (c)(1),
(2) Date: Oct. 1, 2021

(87) PCT Pub. No.: WO2020/203017
PCT Pub. Date: Oct. 8, 2020

(65) Prior Publication Data
US 2022/0050589 A1 Feb. 17, 2022

(30) Foreign Application Priority Data
Apr. 1, 2019 (JP) .................................. 2019-069759

(51) Int. Cl.
*G06F 3/00* (2006.01)
*G06F 3/04847* (2022.01)
(Continued)

(52) U.S. Cl.
CPC ...... *G06F 3/04847* (2013.01); *B29C 45/7626* (2013.01); *G06F 3/0481* (2013.01);
(Continued)

(58) Field of Classification Search
CPC .. G06F 3/04847; G06F 3/0481; G06F 3/0488; B29C 45/7626; B29C 2945/76551; B29C 2945/76568
See application file for complete search history.

(56) References Cited

U.S. PATENT DOCUMENTS 5,326,246 A * 7/1994 Usui .................. G05B 19/4069
 425/149
9,358,712 B2 * 6/2016 Grimm ................... B29C 45/76
(Continued)

FOREIGN PATENT DOCUMENTS

EP 1085389 A1 3/2001
JP H05-162177 A 6/1993
(Continued)

OTHER PUBLICATIONS

International Search Report issued in corresponding International Patent Application No. PCT/JP2020/009429, dated Jun. 2, 2020, with English translation.
(Continued)

*Primary Examiner* — Kieu D Vu
*Assistant Examiner* — Andrew Chung
(74) *Attorney, Agent, or Firm* — McDermott Will & Emery LLP

(57) ABSTRACT

An operation setting device includes a first step of inputting an operation sequence and an operation position of the ejector by touching a desired point in a graph displayed on the setting display screen, a second step of inputting operation parameters including an operation speed, an operation position, an operation time, and an operation pattern of the ejector on the basis of the operation position thus input, and a third step of displaying in the graph and numerically displaying in a numerical value display part of the setting display screen the operation position and the operation parameters thus input. The operation position and operation
(Continued)

parameters for each operation set in the first step to the third step are displayed in the graph and numerically displayed in the numerical value display part.

12 Claims, 25 Drawing Sheets

(51) Int. Cl.
 *B29C 45/76* (2006.01)
 *G06F 3/0481* (2022.01)
 *G06F 3/0488* (2022.01)
(52) U.S. Cl.
 CPC .. *G06F 3/0488* (2013.01); *B29C 2945/76551* (2013.01); *B29C 2945/76568* (2013.01)

(56) References Cited

U.S. PATENT DOCUMENTS

| | | | |
|---|---|---|---|
| 10,987,842 B2* | 4/2021 | Mensler | B29C 45/77 |
| 2003/0012845 A1* | 1/2003 | Doyle | B29C 45/2806 |
| | | | 425/562 |
| 2005/0082708 A1 | 4/2005 | Nishizawa | |
| 2005/0098912 A1* | 5/2005 | Haruo | B29C 45/7653 |
| | | | 264/328.1 |
| 2005/0214407 A1* | 9/2005 | Watanabe | B29C 45/7653 |
| | | | 425/595 |
| 2005/0244537 A1* | 11/2005 | Uchiyama | B29C 45/1751 |
| | | | 425/593 |
| 2006/0017416 A1* | 1/2006 | Konno | B29C 45/7666 |
| | | | 318/645 |
| 2008/0003320 A1* | 1/2008 | Saito | B29C 45/4005 |
| | | | 425/139 |
| 2008/0136785 A1* | 6/2008 | Baudisch | G06F 3/0488 |
| | | | 345/173 |
| 2010/0161108 A1* | 6/2010 | Yeager | G06F 3/0482 |
| | | | 715/702 |
| 2013/0103184 A1 | 4/2013 | Morikawa et al. | |
| 2013/0331963 A1* | 12/2013 | Ahangar | G05B 23/0272 |
| | | | 700/83 |
| 2014/0046465 A1* | 2/2014 | de Oliveira Antunes | |
| | | | B29C 45/2703 |
| | | | 700/97 |
| 2017/0121481 A1* | 5/2017 | Hatanaka | C08J 9/0061 |
| 2018/0147765 A1* | 5/2018 | Nanri | B29C 45/66 |
| 2018/0264701 A1* | 9/2018 | Galati | B29C 45/77 |
| 2019/0220178 A1* | 7/2019 | Uwano | G06F 3/04847 |

FOREIGN PATENT DOCUMENTS

| | | |
|---|---|---|
| JP | 2001-154717 A | 6/2001 |
| JP | 2004-155073 A | 6/2004 |
| JP | 2005-138582 A | 6/2005 |
| JP | 2011-230310 A | 11/2011 |
| JP | 2014046498 A * | 8/2012 |
| JP | 2014091259 A * | 11/2012 |

OTHER PUBLICATIONS

Extended European Search Report issued in corresponding European Patent Application No. 20782673.6, dated Nov. 4, 2022.

* cited by examiner

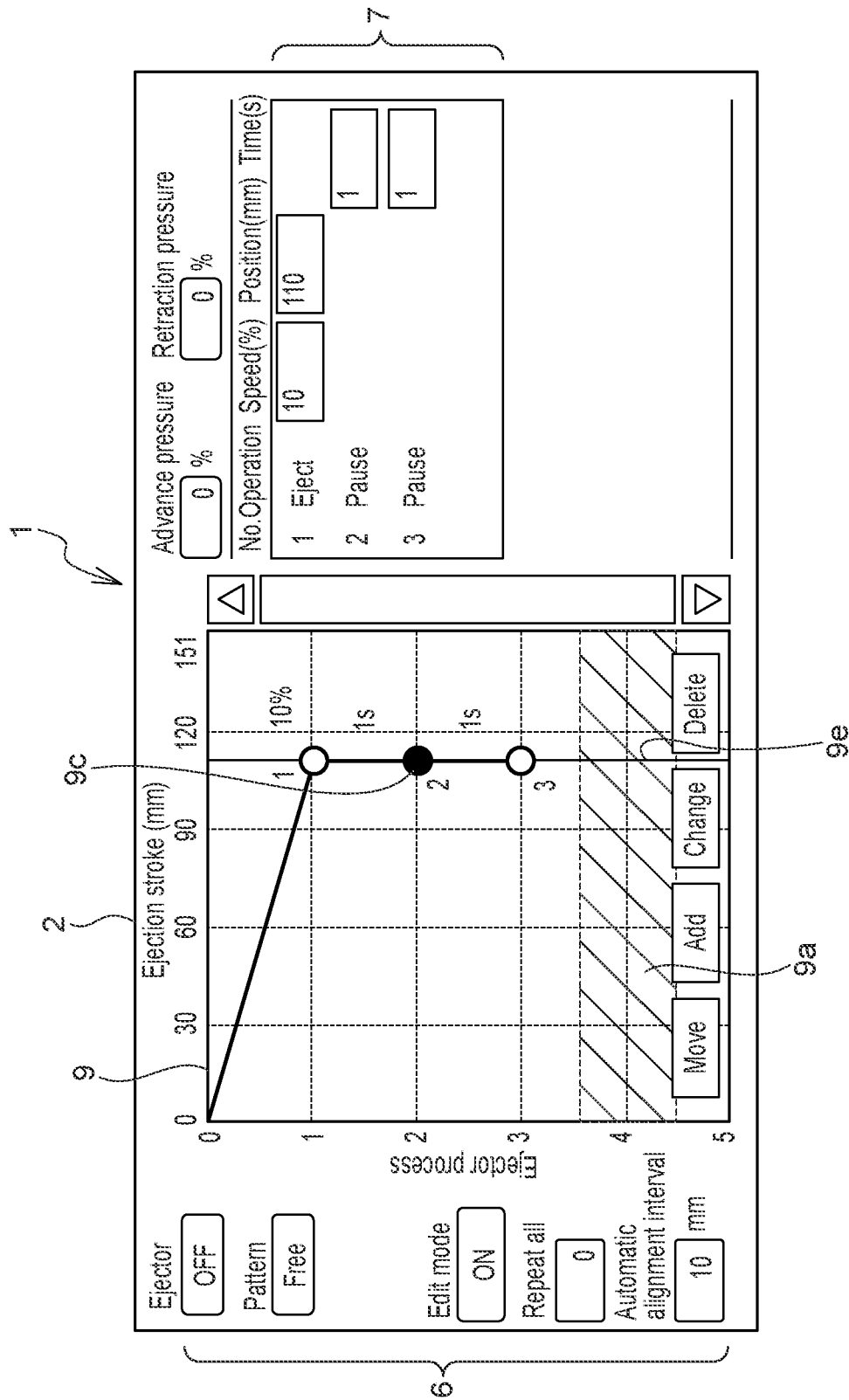

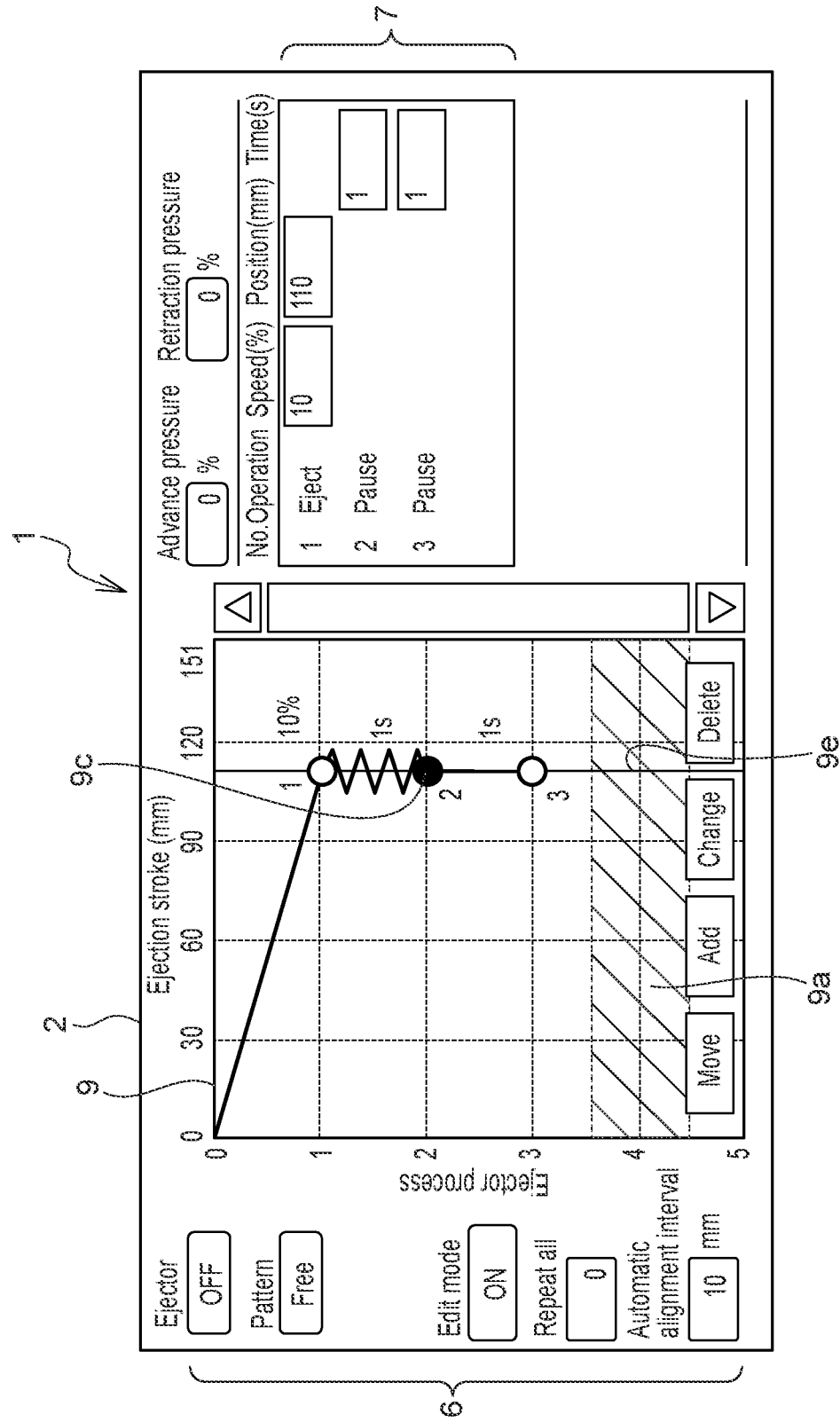

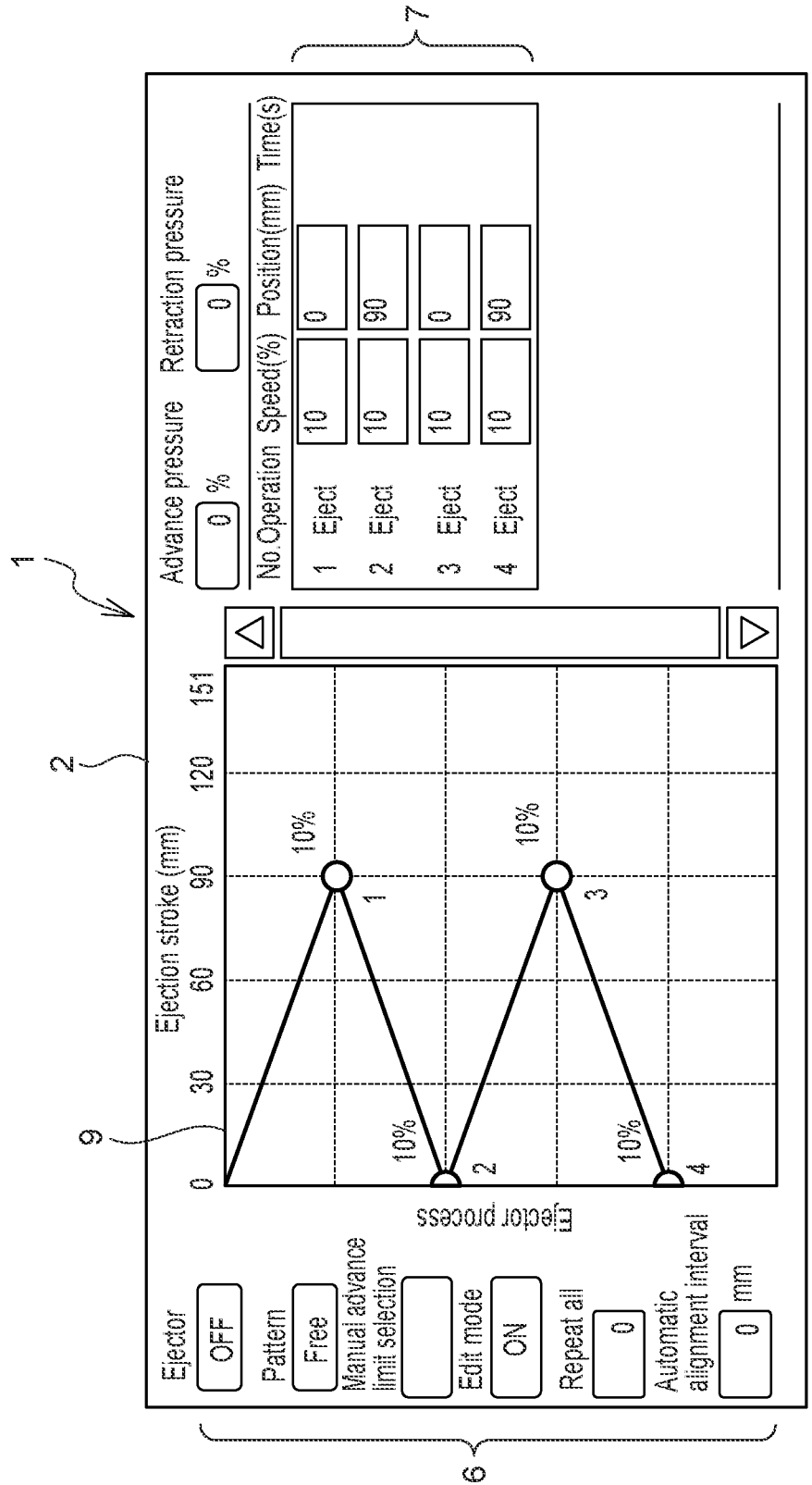

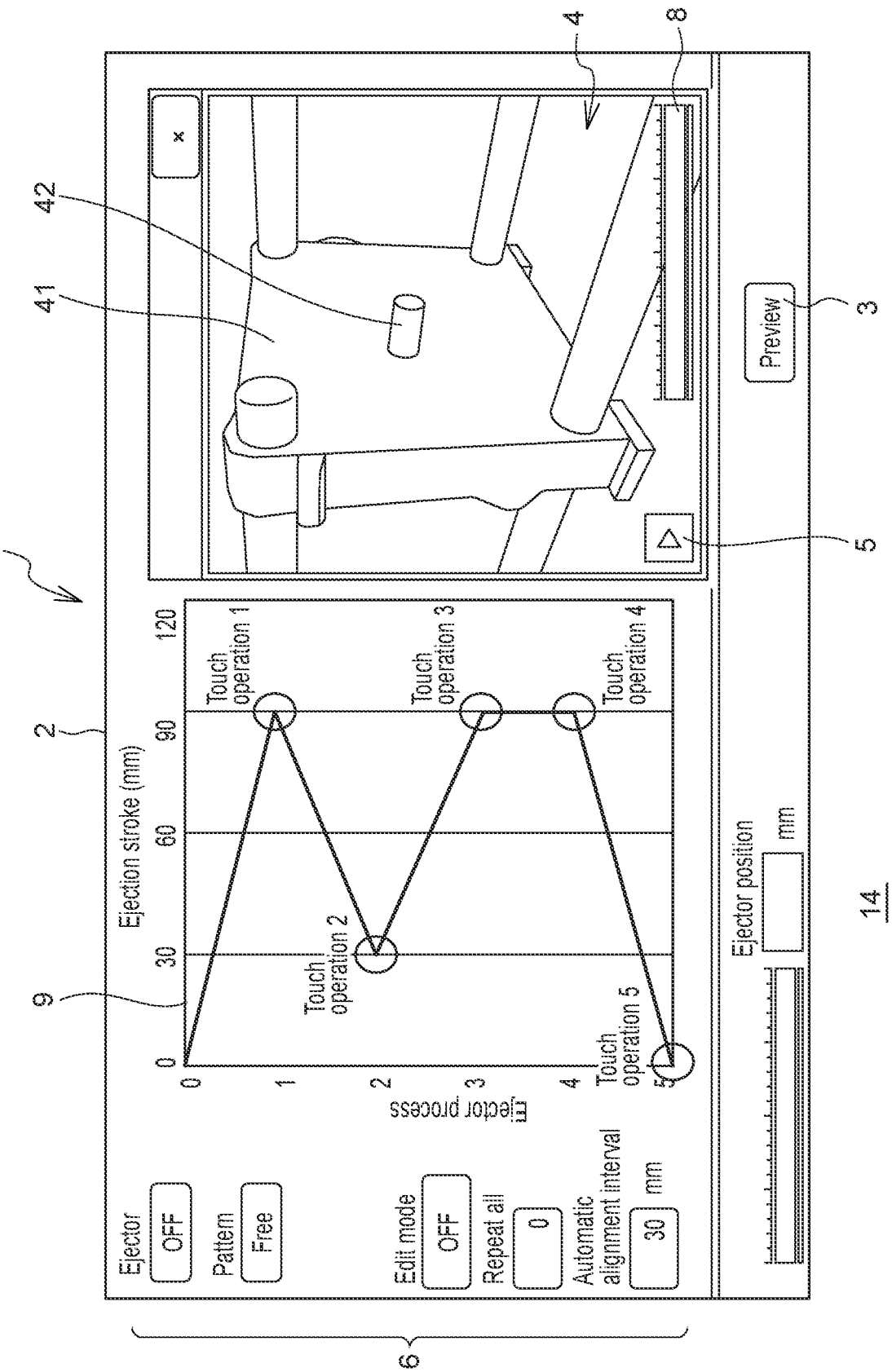

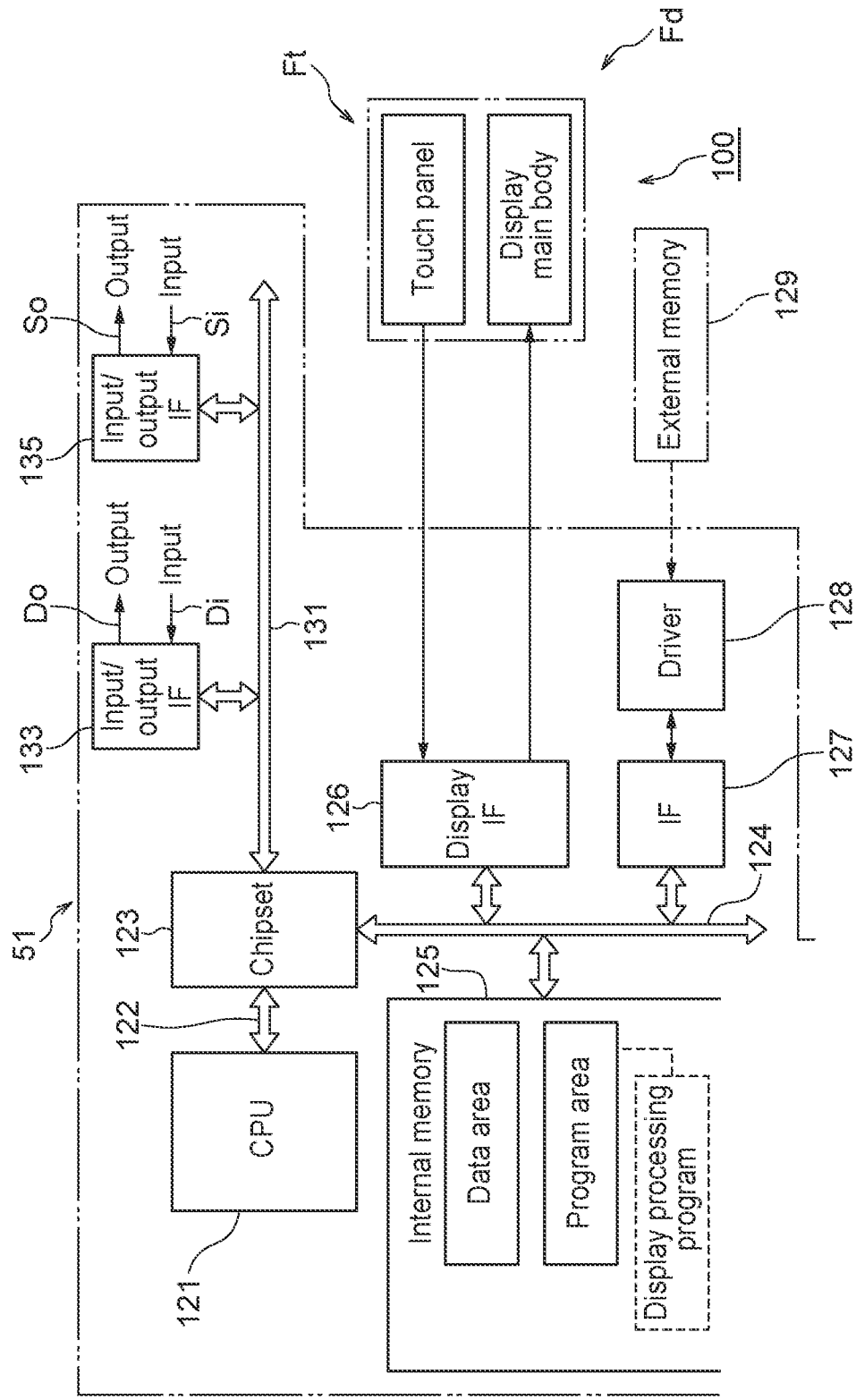

OPERATION SETTING DEVICE AND INJECTION MOLDING MACHINE

CROSS-REFERENCE OF RELATED APPLICATIONS

This application is a U.S. Continuation of International Patent Application No. PCT/JP2020/009429, filed on Mar. 5, 2020, which in turn claims the benefit of Japanese Application No. 2019-069759, filed on Apr. 1, 2019, the entire disclosures of which Applications are incorporated by reference herein.

FIELD OF THE INVENTION

The present invention relates to an operation setting device and an injection molding machine that facilitate the setting of ejector operations in the injection molding machine.

BACKGROUND ART

In an injection molding machine, when a molded product obtained by injection molding is extracted from a mold, an ejector is operated (an "ejector operation" is performed) to release and extract the molded product from the mold. The ejector operation is performed by ejecting an ejector rod toward the mold with the mold opened. However, extracting the molded product by one ejection operation of the ejector rod may be difficult and, in many cases, the ejection operation of the ejector rod is repeated. Such an ejector operation is performed by setting a plurality of operation patterns so that the molded product can be reliably extracted.

The ejector operation of the injection molding machine is a complicated operation, making the setting of the operation complex. For such a complex setting, for example, Patent Document 1 provides an ejector control device that makes it possible to easily set an ejector operation pattern. Specifically, a technique is proposed in which an ejector control device of an injection molding machine is provided with a process setting means for setting per process a target arrival position of a moving operation of an ejector and a moving speed to the target arrival position, a process sequence setting means for setting an operation sequence of a plurality of the processes set by the process setting means, and a process executing means for executing the moving operation of the ejector in accordance with the operation sequence set by the process sequence setting means, thereby making it possible to set an ejector operation pattern in process units. In this technique, the ejector operation pattern can be divided into a plurality of processes and the operations can be set per process, making it possible to set and modify the ejector operation pattern in process units, easy to set the ejector operation pattern and modify an ejector operation pattern already set, and possible to easily set and modify the ejector operation pattern in response to a shape and a material of the molded product.

PRIOR ART DOCUMENTS

Patent Documents

Patent Document 1: Japanese Laid-Open Patent Application No. 2008-6785

SUMMARY OF THE INVENTION

Problems to be Solved by the Invention

In the technique of Patent Document 1, after the number of processes is set, it is necessary to set four conditions, that is, a start condition, a delay timer, a position, and a speed for each process. In the conventional technique represented by Patent Document 1, the setting of the ejector operation of the injection molding machine is complicated, and must be performed on a complex setting display screen.

The present invention has been made to solve such conventional problems, and an object of the present invention is to provide an operation setting device and an injection molding machine that, in the setting of an ejector operation of the injection molding machine, eliminates complicated settings for performing an ejector operation and complexities of a screen associated therewith, and makes it easy to set the ejector operation of the injection molding machine.

Means for Solving the Problems

An operation setting device according to the present invention is a device for setting operations of an ejector provided with a setting display screen of a touch panel type, and comprises a first step of inputting an operation sequence and an operation position of the ejector by touching a desired point in a graph displayed on the setting display screen, a second step of inputting operation parameters including an operation speed, an operation position, an operation time, and an operation pattern of the ejector on the basis of the operation position thus input, and a third step of displaying in the graph and numerically displaying in a numerical value display part of the setting display screen the operation position and the operation parameters thus input. The operation position and operation parameters for each operation set in the first step to the third step are displayed in the graph and numerically displayed in the numerical value display part.

According to the present invention, the operation position and the operation parameters for each operation thus set are displayed in the graph and numerically displayed in the numerical value display part of the setting display screen, making it possible to easily image the ejector operations in the graph and furthermore numerically confirm the operation parameters. This setting display screen is a touch panel by which necessary information can be displayed and intuitive operations can be performed, making it possible to easily perform input operations of ejector operations. In particular, the setting display screen can be set by directly touching the graph, and thus can be visually set.

In the operation setting device according to the present invention, the setting display screen comprises an executing means for executing the operation parameters thus set. According to this invention, the operation parameters thus set can be executed by this executing means.

The operation setting device according to the present invention further comprises a correction function for correcting a point erroneously input by the touch operation, and a setter for finely modifying the operation position and the operation parameters thus input. According to this invention, the operation setting device includes the correction function for correcting a point erroneously input, making it possible to change the operation position in a narrow range, which is a drawback of a touch operation. The operation position and operation parameters can be finely modified with the setter, which allows direct input of numerical values.

In the operation setting device according to the present invention, the graph is stored as molding conditions. According to this invention, the operation parameters displayed in the graph can be managed as molding conditions. The managed molding conditions are called from storage memory, thereby making it possible to utilize operation parameters set in the past and facilitate the settings.

In the operation setting device according to the present invention, the graph and the numerical value display are linked. According to this invention, because the graph and the numerical value display are linked, the value input by touch to the graph is numerically displayed or the graph is displayed on the basis of the numerically displayed values.

The operation setting device according to the present invention further comprises an edit mode for editing the operation position and the operation parameters. The operation position or a location of the operation parameters to be edited are displayed in a band when the edit mode is switched to ON. According to this invention, the operation position or the location of the operation parameters to be edited are displayed in a band, making it possible to easily understand the portion to be edited and facilitate the settings.

In the operation setting device according to the present invention, a maximum advance limit is displayed in color in the graph when the ejector is advanced. According to this invention, the maximum advance limit is displayed in color in the graph, making it possible to prevent a setting exceeding the maximum advance limit.

The operation setting device according to the present invention further comprises a function for copying and pasting the operation position and the operation parameters displayed in the graph. According to this invention, with such a function, the time and labor required to set the operation position and the operation parameters can be saved.

The operation setting device according to the present invention further comprises a preview function for previewing an operation image displayed on the setting display screen. According to this invention, the preview function allows the operation displayed on the setting display screen to be previewed and visually confirmed, which helps to confirm whether or not there is a setting error or the like.

(2) An injection molding machine according to the present invention comprises the operation setting device according to the above-described present invention.

Effect of the Invention

According to the present invention, it is possible to provide an operation setting device and an injection molding machine that, in the setting of an ejector operation of the injection molding machine, eliminates complicated settings for performing an ejector operation and complexities of a screen associated therewith, and makes it easy to set the ejector operation of the injection molding machine.

BRIEF DESCRIPTION OF THE DRAWINGS

FIGS. 8A and 8B are examples of a display screen in operation settings (Part 5).

FIGS. 12A and 12B are examples of a display screen in operation settings (Part 9).

FIGS. 13A and 13B are examples of a preview display screen.

FIG. 14 is a block system diagram of a controller.

EMBODIMENTS OF THE INVENTION

Figure 1:
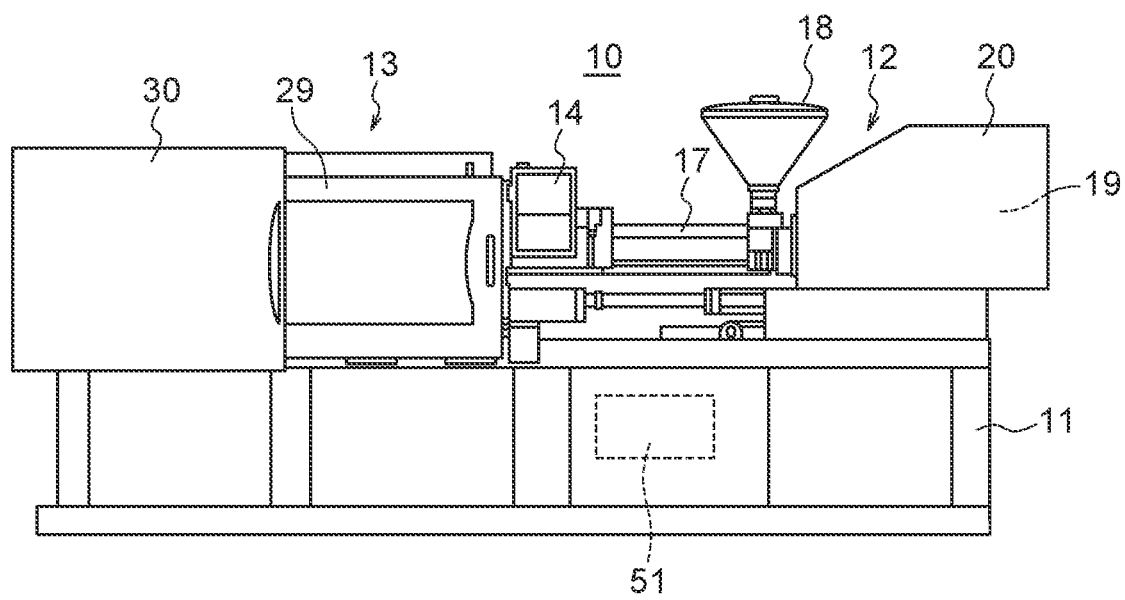
FIG. 1 is an example of an injection molding machine provided with an operation setting device according to the present invention.

The following describes an operation setting device and an injection molding machine according to the present invention with reference to the drawings. It should be noted that the present invention is not limited to the following embodiments and includes various modifications and applications within the scope of the gist.

As illustrated in each drawing, an operation setting device 1 according to the present invention is a device for setting operations of an ejector 40 provided with a setting display screen 2 of a touch panel type. The configuration includes a first step of inputting an operation sequence and an operation position of the ejector 40 by touching a desired point in a graph 9 displayed on the setting display screen 2, a second step of inputting operation parameters including an operation speed, an operation position, an operation time, and an operation pattern of the ejector 40 on the basis of the operation position thus input, and a third step of displaying in the graph 9 and numerically displaying in a numerical value display part 7 of the setting display screen 2 the operation position and the operation parameters thus input. Then, the first step to the third step are performed for each operation sequence, and the operation position and operation parameters for each operation are displayed in the graph 9 and numerically displayed in the numerical value display part 7.

This operation setting device 1 displays in the graph 9 and numerically displays in the numerical value display part 7 of the setting display screen 2 the operation position and the operation parameters for each operation, making it possible to easily image the operations of the ejector 40 in the graph 9 and furthermore numerically confirm the operation parameters. This setting display screen 2 is a touch panel by which necessary information can be displayed and simple input operations can be performed, making it possible to facilitate input for the operations of the ejector 40. In particular, the setting display screen 2 can be set by directly touching the graph 9, and thus can be visually set.

The following describes each component.

[Injection Molding Machine]

An injection molding machine 10 includes at least an injection device 12, a mold clamping device 13, and a display device 14, on a machine base 11, as an overall view thereof is illustrated in FIG. 1. A cover 20, a safety door 29, and a cover 30 are provided to respective positions of a drive part of the injection device 12 and the mold clamping device 13. It should be noted that a control device 51 is disposed in the machine base 11 in the example of FIG. 1.

<Ejector>

Figure 2:
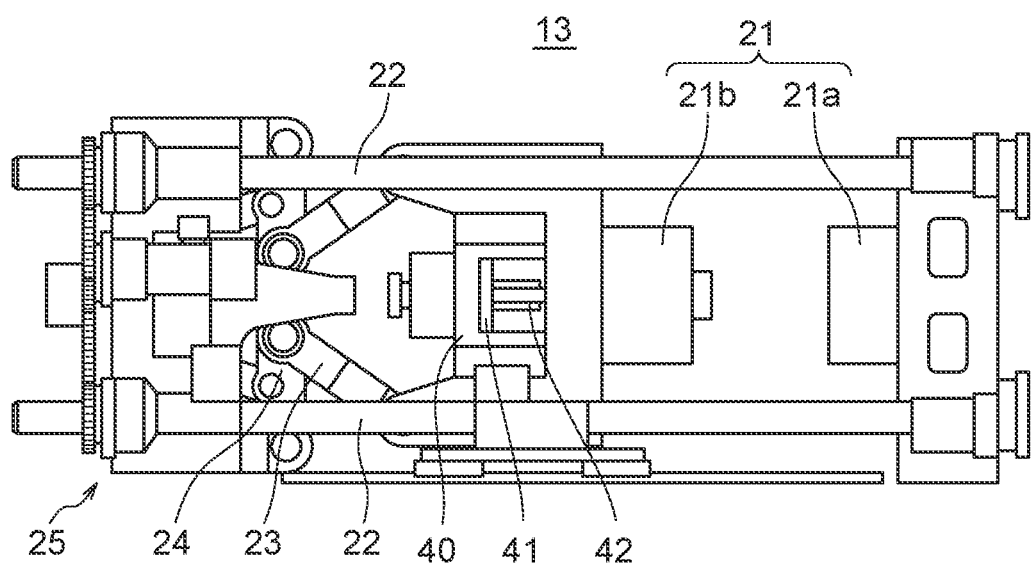
FIG. 2 is a schematic view illustrating an example of an ejector device provided to a mold clamping device.

As illustrated in FIG. 2, the ejector 40 is provided in the mold clamping device 13. The mold clamping device 13 includes a mold 21 constituted by a fixed mold 21a and a movable mold 21b, and is a device for performing mold closing, mold opening, high-pressure mold clamping, and the like. The mold 21 is filled with plastic injected from a tip end nozzle of a heating cylinder 17 provided to the injection device 12. The plastic filled in this mold 21 is cooled and solidified, and therefore molded. After the mold 21 is opened, the molded product is ejected (extracted) from the mold 21 by the operation of the ejector 40.

It should be noted that, as illustrated in FIG. 2, the mold clamping device 13 provided with the ejector 40 advances and retracts the movable mold 21b attached to a movable platen to perform the mold closing, the mold opening, the high-pressure mold clamping, and the like. The advancing and retracting of the movable mold 21b are performed by a conventionally known means for driving a mold clamping drive part 25 and, using a ball screw (not illustrated) and a crosshead 24, extending and bending a toggle link 23. It should be noted that four tie bars 22 that are erected support the movable platen to which the movable mold 21b is attached and guide the advancing and retracting.

In such a mold clamping device 13, the molded product is attached to the movable mold 21b after the mold is opened without being released. When the molded product is to be removed from this movable mold 21b, the ejector 40 is operated to release and extract the molded product from the mold 21. As illustrated in FIG. 2, the operation of the ejector 40 is performed by ejecting an ejector rod 42 provided to an ejector base 41 into the opened movable mold 21b. While the operation of the ejector 40 is performed by ejecting the ejector rod 42, extracting the molded product by one ejection operation may be difficult and, in many cases, the ejector rod 42 is ejected a plurality of times. Conventionally, such an operation of the ejector 40 is performed by setting a plurality of operation patterns so that the molded product can be reliably extracted. The operation of the ejector 40 is a complicated operation, making the setting of the operation complex. While improvements in such a complexity have been required, the improvements have been insufficient. The present invention solves such problems.

[Operation Setting Device]

The operation setting device 1 is a device for setting the operation of the ejector 40. This operation setting device 1 is a device for setting the operation of the ejector 40 provided with the setting display screen 2 of a touch panel type, and is constituted in a plurality of steps such as described below.

<Setting Display Screen>

The setting display screen 2 is a display screen including a touch panel, in whole or in part. The touch panel is adopted in at least the graph 9 input by touch operations. Any other location may also be a touch panel, and the entire screen may be a touch panel. A setting item button group 6 is disposed on the left side of the setting display screen 2. The setting item button group 6 is not particularly limited in terms of setting items and layout as long as the necessary setting item buttons are arbitrarily disposed, and may include a setting item display for displaying the setting items. In the setting item button group 6 illustrated in FIG. 3, from the top, an ejector selection button, a pattern selection button, an edit mode button, a repeat all display, and an automatic alignment interval display are disposed. It should be noted that the "button" may be a push button, but here refers to a button that can be input by a touch operation on the touch panel.

Figure 3:
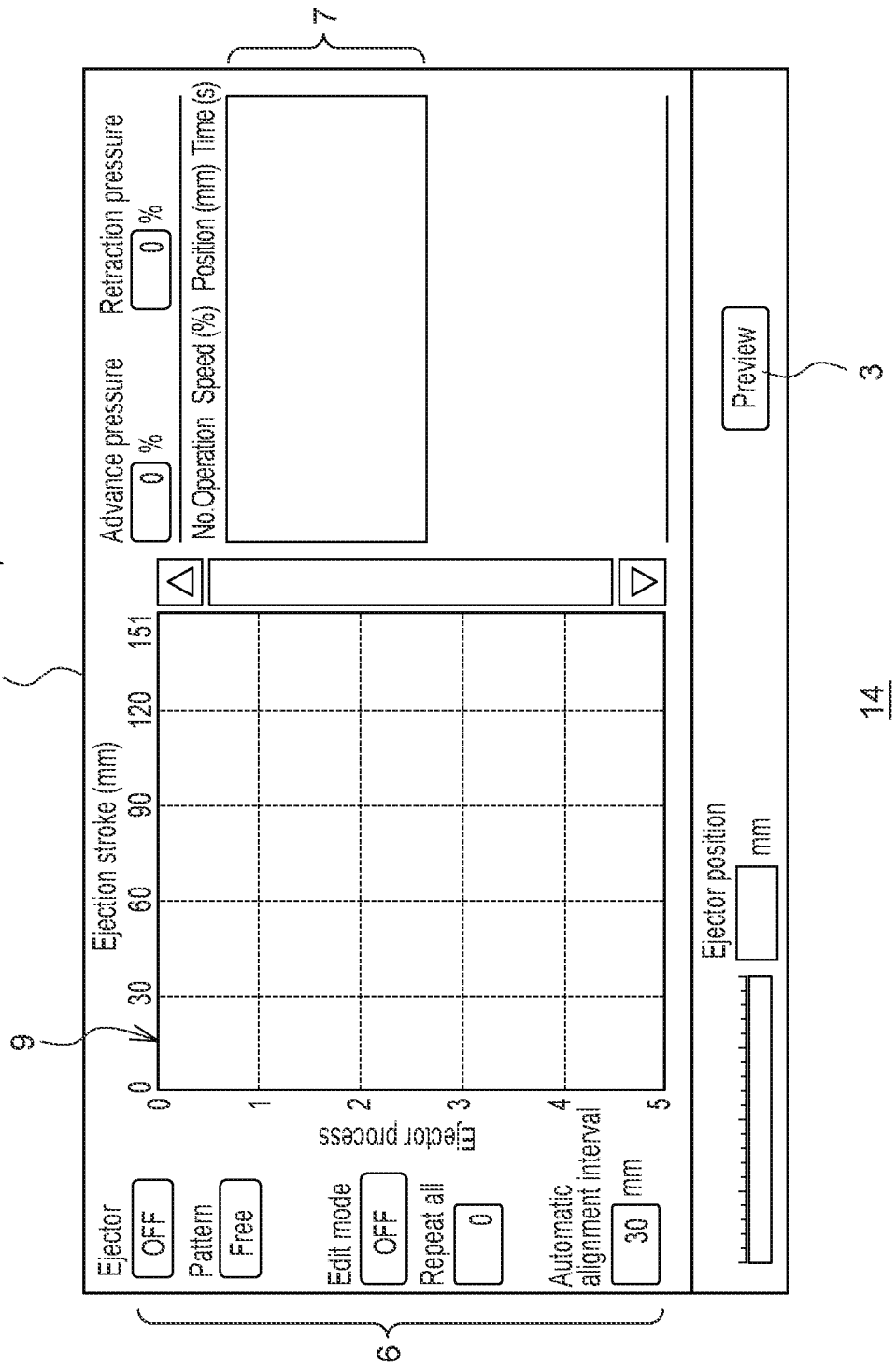
FIG. 3 is an example of a setting display screen.

Specifically, in the setting item button group 6 on the left side of the setting display screen 2 illustrated in FIG. 3, the "Ejector" button is a button for selecting ON or OFF for the ejector. The "Pattern" button is a switch button for the operation patterns of the ejector 40, and "Free" means that the operation pattern can be freely set on the graph 9. The "Edit mode" button is a selection button when inputting an operation pattern on the graph 9. The "Repeat all" display is used for setting and displaying the number of repetitions of the operation of the ejector 40, and the "Automatic alignment interval" display is used for setting and displaying the automatic alignment interval.

In the example of FIG. 3, the graph 9 is displayed on the left half of the setting display screen 2. The vertical axis of the graph 9 indicates ejector processes, and the horizontal axis of the graph is a scale indicating an ejection stroke. A scroll bar is displayed on the right side of the graph 9. A gauge indicating the current position of the ejector is displayed at the lower left of the setting display screen 2. On the right side of the gauge, the "Ejector position" is displayed as a numerical value. At the upper portion of the right half of the setting display screen 2, a field for setting "Advance pressure" and a field for setting "Retraction pressure" of the ejector 40 are displayed. The advance pressure and the retraction pressure refer to the advance pressure and the retraction pressure of the ejector in all processes. The numerical value display part 7 is disposed on the right half of the setting display screen 2. The numerical value display part 7 is a portion where a "Speed (%)," a "Position (mm)," and a "Time (s)" for each operation of the ejector 40 are displayed. A "Preview" button 3 is displayed at the lower right of the setting display screen 2, and is a button for previewing a two-dimensional (2D) image or moving image, or a three-dimensional (3D) image or moving image of the ejector settings.

In the example of FIG. 3, the graph 9 is displayed on the left half of the setting display screen 2, and the set operation position and operation parameters are displayed as a graph pattern. Here, the "operation parameters" refer to the operation items of the ejector 40, including advance, retraction, ejection (advance) stroke length, retraction stroke length, pause time, shake time, and the like of the ejector rod 42. In the present invention, such operation parameters can be set by touch input to the graph 9. Then, the operation pattern is displayed in the graph 9 by input, and the numerical value display part 7 linked with the graph is displayed on the right side of the setting display screen 2, making it possible to confirm the setting values on the numerical value display part 7 while visually confirming the entire operation pattern.

Figure 15:
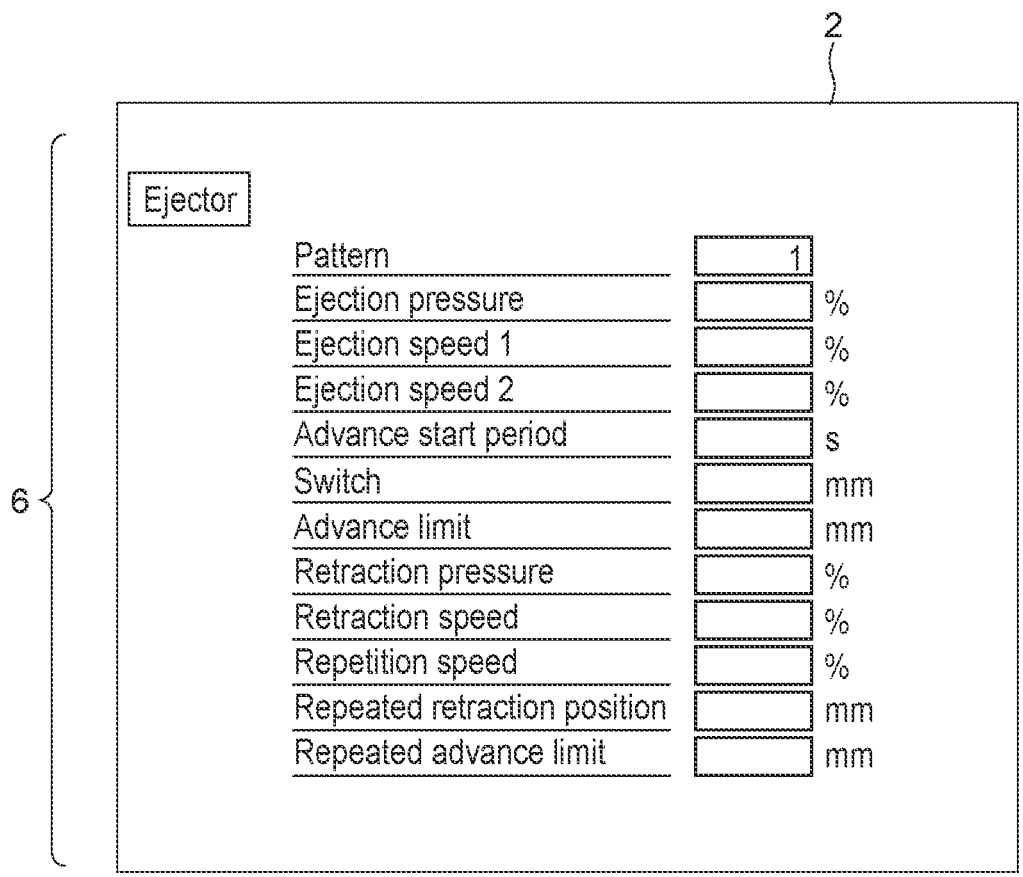
FIG. 15 is an example of a conventional setting display screen.

It should be noted that FIG. 15 illustrates a conventional example, which is a display screen in which setting items and setting values are sequentially arranged, unlike the setting display screen 2 in the present invention. This display screen displays the operations of the ejector 40 as a display screen of setting values not as a graph pattern.

<First Step to Third Step>

The first step is a step of inputting the operation sequence and the operation position of the ejector 40 by touching a desired point in the graph 9 displayed on the setting display screen 2. The second step is a step of inputting operation parameters including a speed, a position, a time, and an operation pattern of the ejector 40 on the basis of the input operation position. Then, the third step is a step of displaying in the graph 9 and numerically displaying in the numerical value display part 7 of the setting display screen 2 the input operation position and operation parameters. As illustrated in FIGS. 4 to 12, the setting display screen 2 displays in the graph 9 and numerically displays in the numerical value display part 7 the operation position and the operation parameters for each set operation. Hereinafter, FIGS. 4 to 12 will be described in order.

Figure 4A:
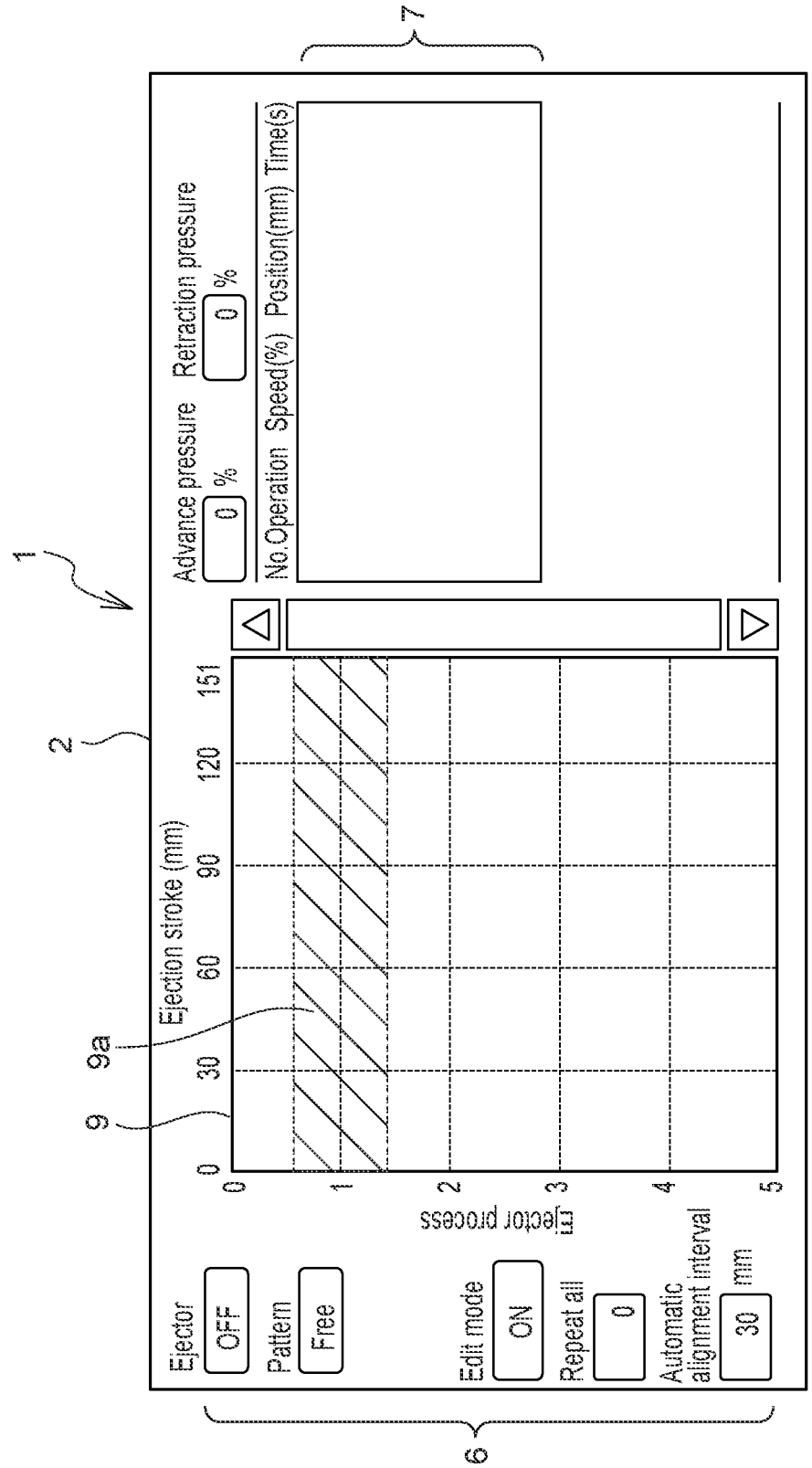
FIGS. 4A and 4B are examples of a display screen in operation settings (Part 1).

The edit mode is OFF in the initial state illustrated in FIG. 3, and therefore is switched to ON as illustrated in FIG. 4A. In that case, a touch input band 9a appears on "process 1" in the graph 9. This touch input band 9a is preferably a band-shaped region, and actually a blue-colored band, for example, is preferably displayed.

Figure 4B:
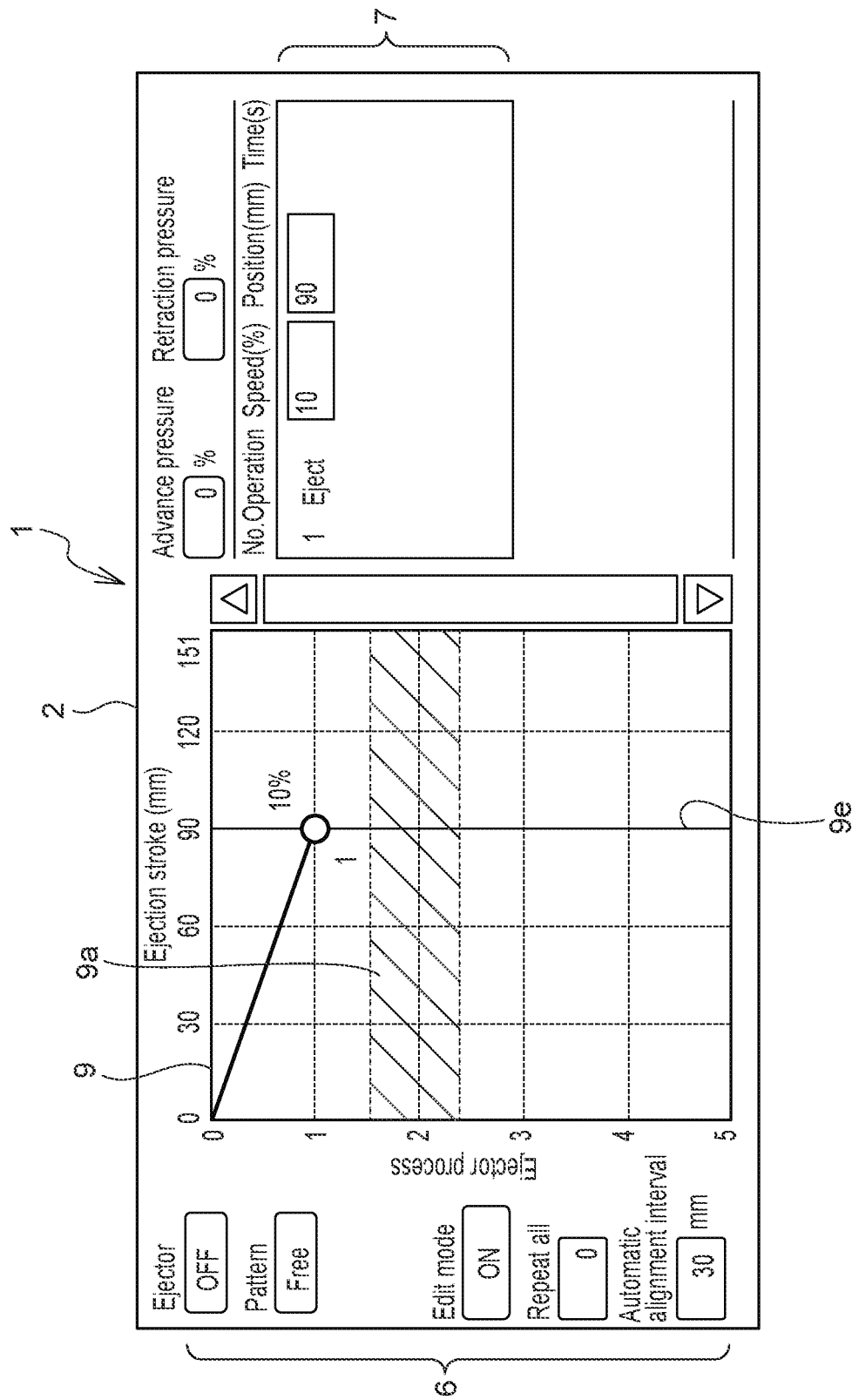

In the touch input band 9a, when a 90-mm point of an ejection stroke is touched, for example, a new process 1 is displayed by a line extending from the origin as illustrated in FIG. 4B. At the same time, the numerical value display part 7 is displayed on the right side, No. "1," the operation "Eject," the speed (%), and the position (mm) "90" are displayed as the display fields for the operation order, the operation display, the operation speed, and the operation position, and "10" in the speed (%) field is displayed by entering "10" in the speed display field. With input of the speed, the speed is displayed as "10%" at the 90-mm point of the ejection stroke in the graph 9. When process 1 is set, the touch input band 9a moves to process 2, as illustrated in FIG. 4B.

Figure 5A:
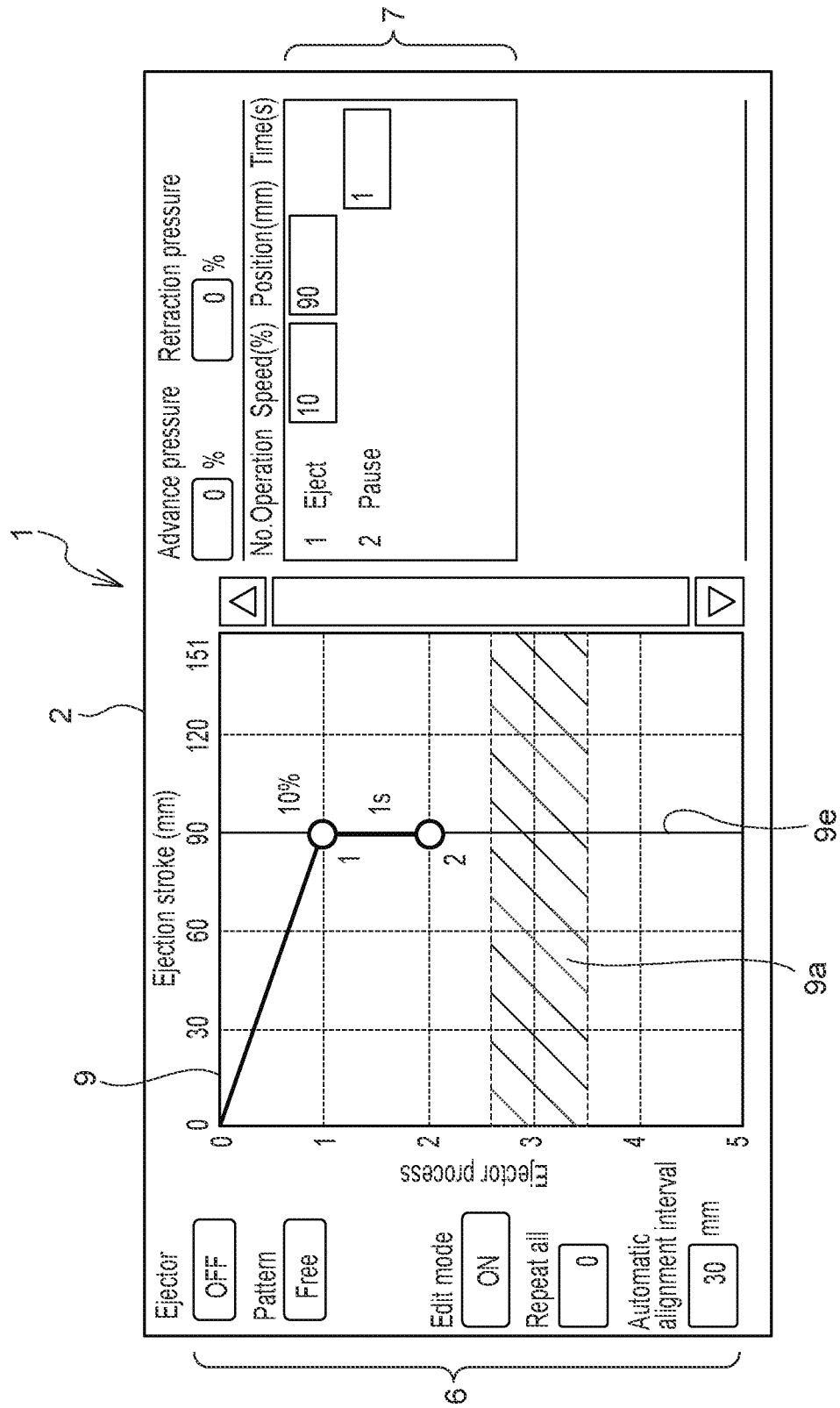
FIGS. 5A and 5B are examples of a display screen in operation settings (Part 2).

FIG. 5A illustrates a case in which the touch input band 9a displayed in process 2 is touched for input. When the touched position is the same operation position as in process 1 as illustrated in FIG. 5A, the operation is paused, and No. "2" and the operation "Pause" are displayed in the numerical value display part 7. For the operation time, "1" is entered as the time (s) in the numerical value display part 7, thereby displaying the time "1 s" at the 90-mm point of the ejection stroke of process 2 in the graph 9. When process 2 is set, the touch input band 9a moves to process 3.

Figure 5B:
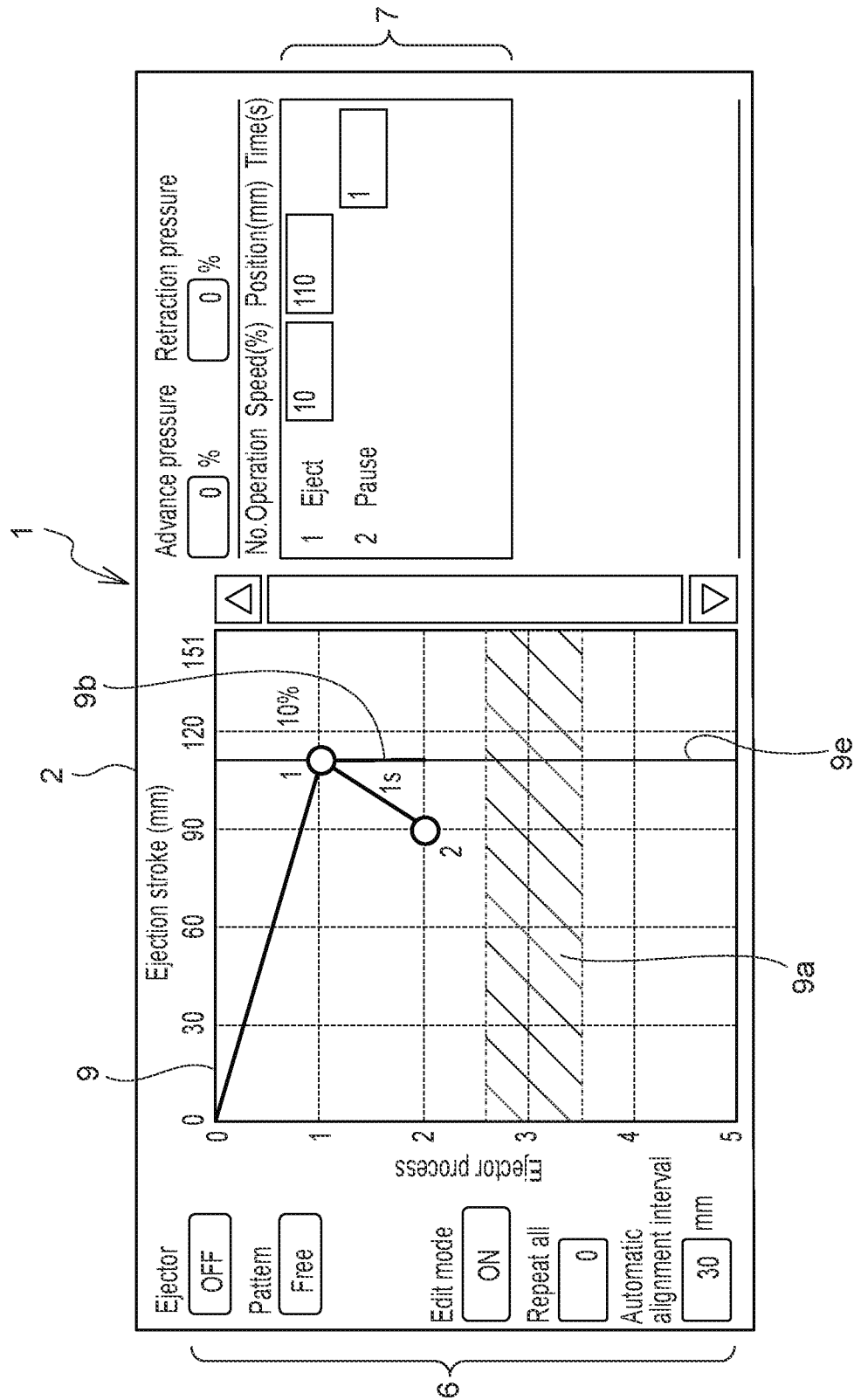

FIG. 5B is an example of a case in which, after process 2 is set, the ejection stroke of process 1 is changed. The touch input band 9a is at the position of process 3, and thus input for step 3 can only be made with the touch input band 9a. However, the operation position field of process 1 in the numerical value display part 7 from "90" to "110" is changed, thereby moving the point of process 1 in the graph 9 to the point corresponding to 110 mm. This way, the operation parameters of a process that has already been set can be changed in the numerical value display part 7, and the changes are linked to the operation pattern and displayed in the graph 9.

In FIG. 5B, process 1 is changed and the graph 9 after the change is displayed. However, because process 2 is "Pause," there is a difference between the operation pattern in the graph 9 and the operation display in the numerical value display part 7. When such a difference occurs, an adjustment line 9b (actually, for example, a red line) representing the movement based on the values in the numerical value display part 7 is drawn, as illustrated in FIG. 5B. It should be noted that, while the adjustment line 9b is displayed, the edit mode cannot be turned OFF. When the adjustment line 9b appears, there is a contradiction between the graph 9 and the numerical value display part 7 in terms of the previous and next processes, and thus either the position of process 1 is returned to the original 90 mm or the position of process 2 is changed using the method illustrated in FIGS. 6A and 6B.

Figure 6A:
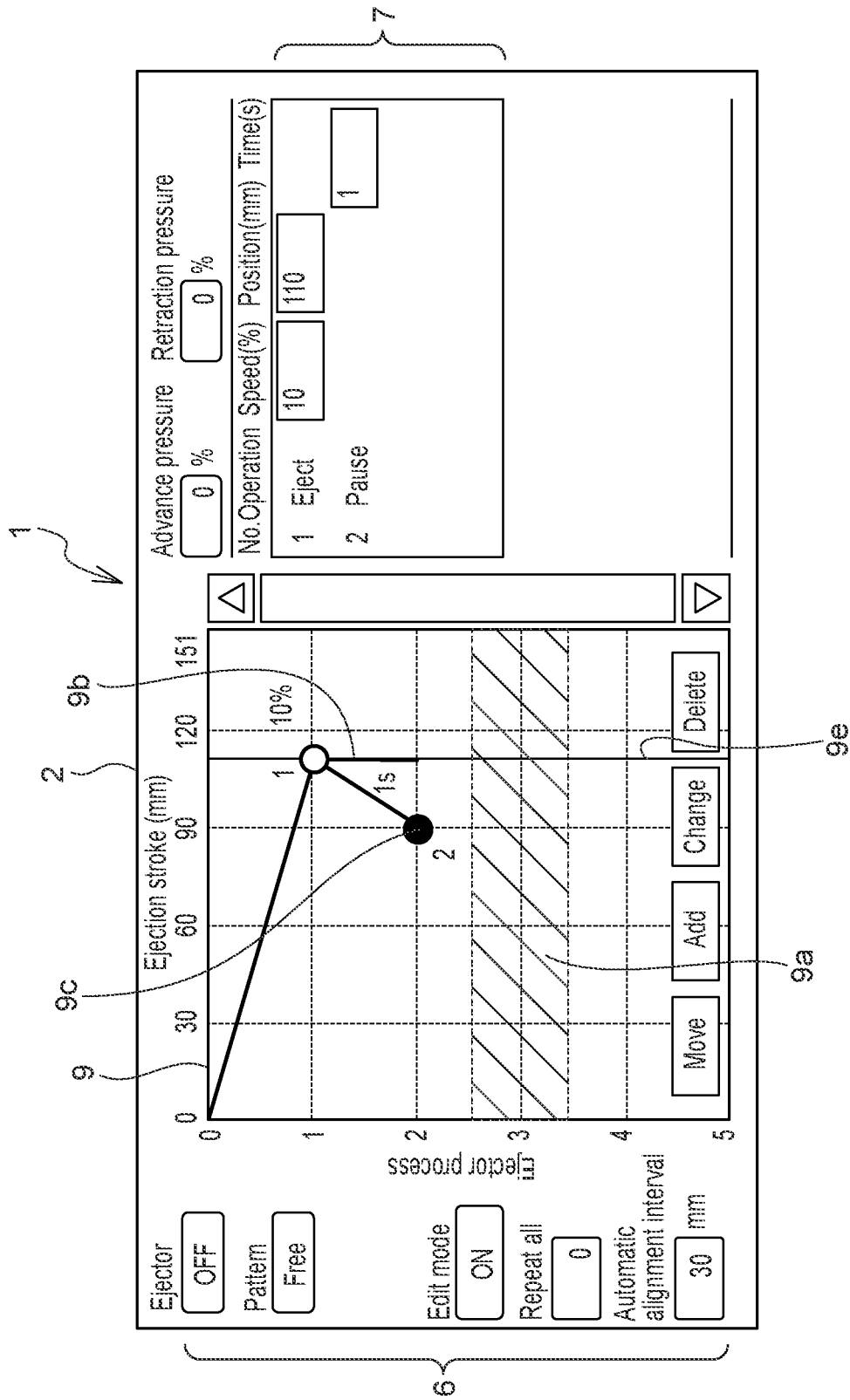
FIGS. 6A and 6B are examples of a display screen in operation settings (Part 3).

FIG. 6A illustrates a case in which the plot position of process 2 that has already been set is touched. By this touch, the plot of process 2 changes in color and becomes a plot 9c subject to a change operation. As a result, the target process 2 is in a setting change state. It should be noted that, when it becomes the plot 9c subject to a change operation, four displays, that is, "Move," "Add," "Change," and "Delete" appear on the lower side of the graph, making it possible to change the operation position (reset the position in the graph 9), change the operation parameters (reset the parameters in the numerical value display part 7), add an operation, and delete an operation.

Figure 6B:
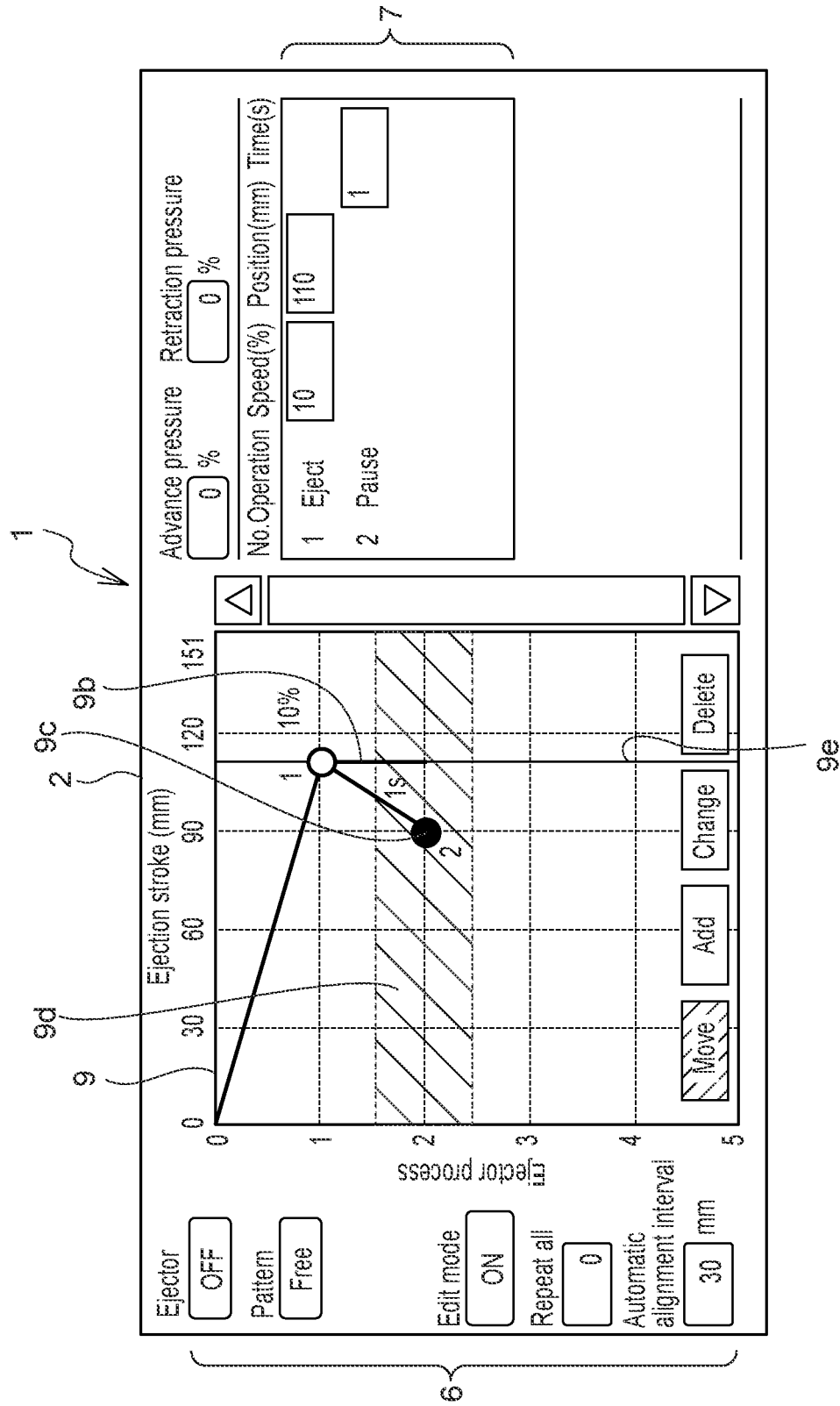

FIG. 6B illustrates a case in which the "Move" button is touched and thus enabled. In this way, the position of the plot of the target process 2 can be reset on the graph 9. At this time, a touch input band 9a colored blue is hidden and a change input band 9d colored yellow is displayed. The position of the plot can be changed by touching a desired point in the change input band 9d. The input result after the change is reflected in conjunction with the numerical value display part 7.

Figure 7A:
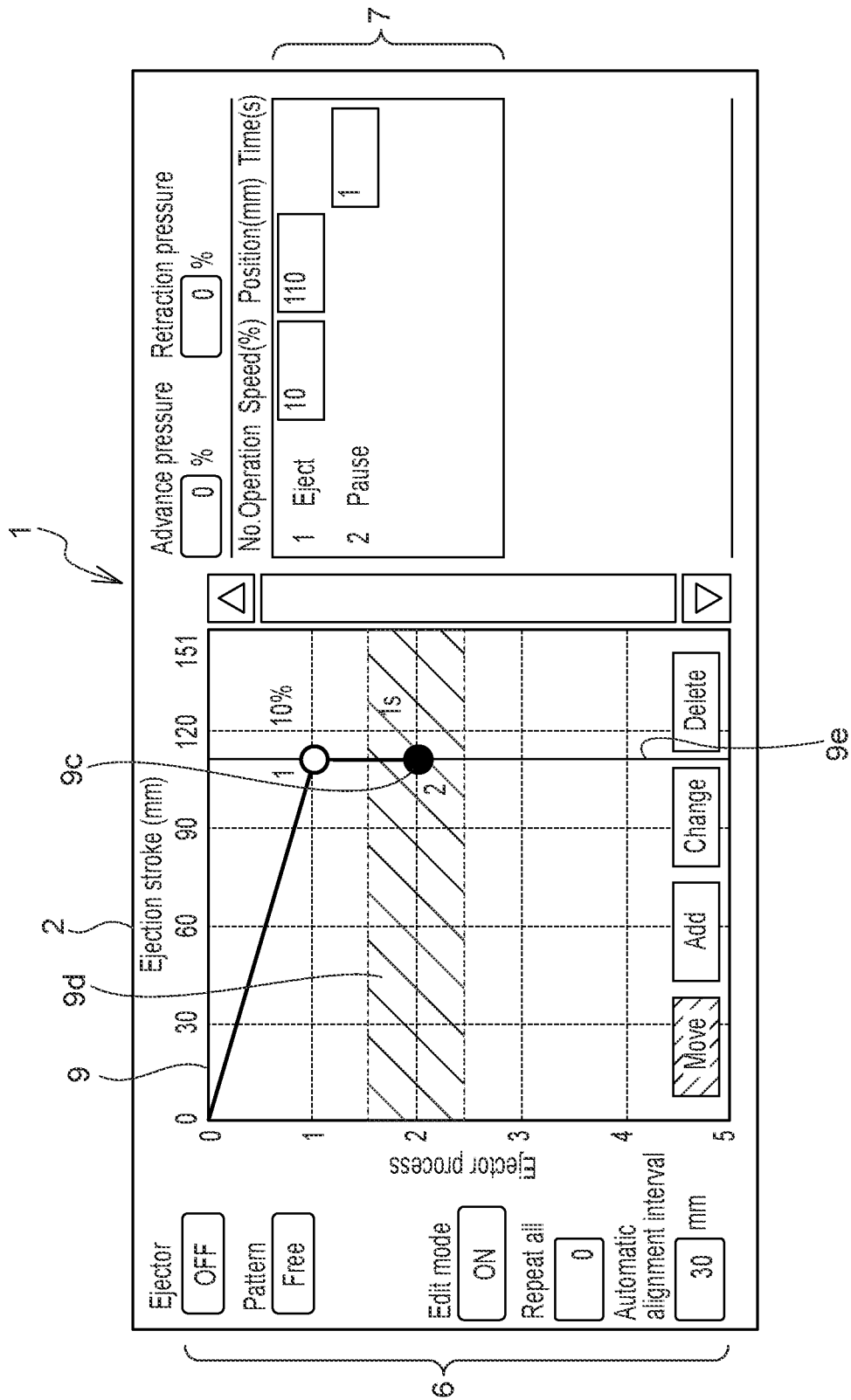
FIGS. 7A and 7B are examples of a display screen in operation settings (Part 4).
Figure 7B:
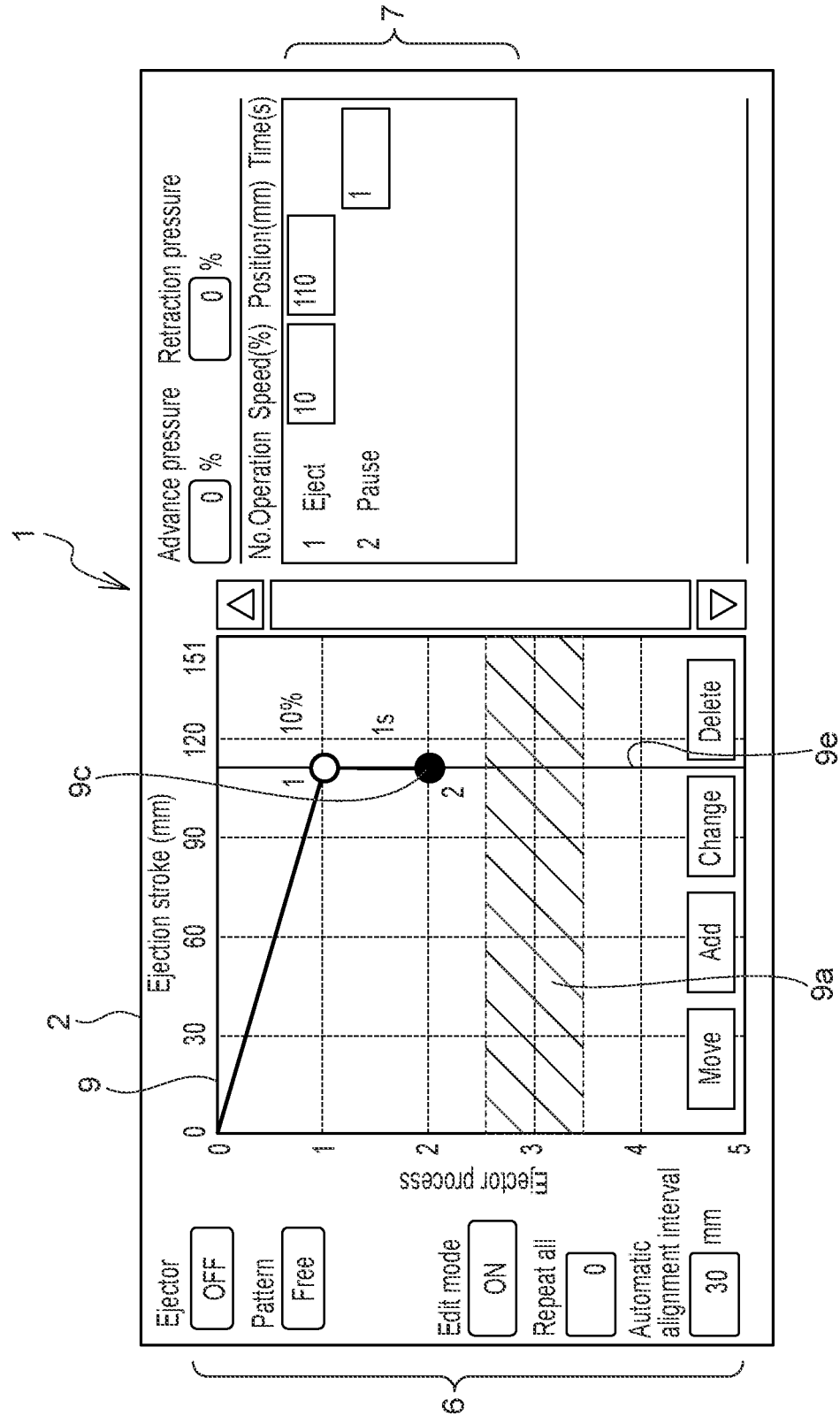

FIG. 7A illustrates a case in which the position of the plot 9c subject to a change operation illustrated in FIG. 6B is changed to the same position as that of the ejection stroke of process 1. The change-operating plot is changed to the same position, eliminating the difference between the operation pattern in the graph 9 and the operation display in the numerical value display part 7 in process 1 and process 2, and thus the adjustment line 9b disappears. This change can be made by touching the ejection stroke of 110 mm on the change input band 9d. While the "Move" button is enabled, operations other than position change cannot be performed. After the position change operation is completed, the "Move" button is pressed again to apply the position, display the touch input band 9a again in process 3, which is the next process, and enable another operation, as illustrated in FIG. 7B. In comparison with the conventional input operation on the setting screen illustrated in FIG. 15, such a touch input operation has the advantages of making it possible to a) change the position by simply touching the graph 9 (there is no need to use a numeric keypad as in the related art), and b) change the position regardless of the type of operation.

FIG. 8A illustrates a case in which the plot of process 2 is touched and changed to the plot 9c subject to a change operation. When the plot 9c subject to a change operation is displayed, the four operation buttons are displayed on the lower side, and here the "Add" button is touched. In that case, as the next process of the selected process 2, process 3 having the same operation parameters as those of process 2 is added. It should be noted that, when another plot already exists in process 3, the new plot is entered in process 3 and the existing process 3 becomes process 4, and subsequent plots are each also shifted back one process. The process added with this "Add" is, for example, added as a pause operation with an initial value of 1 second at the same position as that of the original plot.

FIG. 8B, similar to FIG. 8A, also illustrates a case in which the plot of process 2 is touched and changed to the plot 9c subject to a change operation, but in this FIG. 8B, "Change" is touched. In that case, the operation of the plot 9c subject to a change operation can be changed. Each time "Change" is touched, the operation to be changed circulates in the order of "Eject"->"Pause"->"Shake"->"Eject"->. The example of FIG. 8B is an example in which the plot 9c subject to a change operation of process 2 is set to "Shake," and illustrates an operation pattern in which ejection is performed at a speed of 10% to the 110-mm point of the ejection stroke in process 1, shaking is performed for one second at the same position in process 2, and then a pause is performed for one second without shaking in process 3.

Figure 9A:
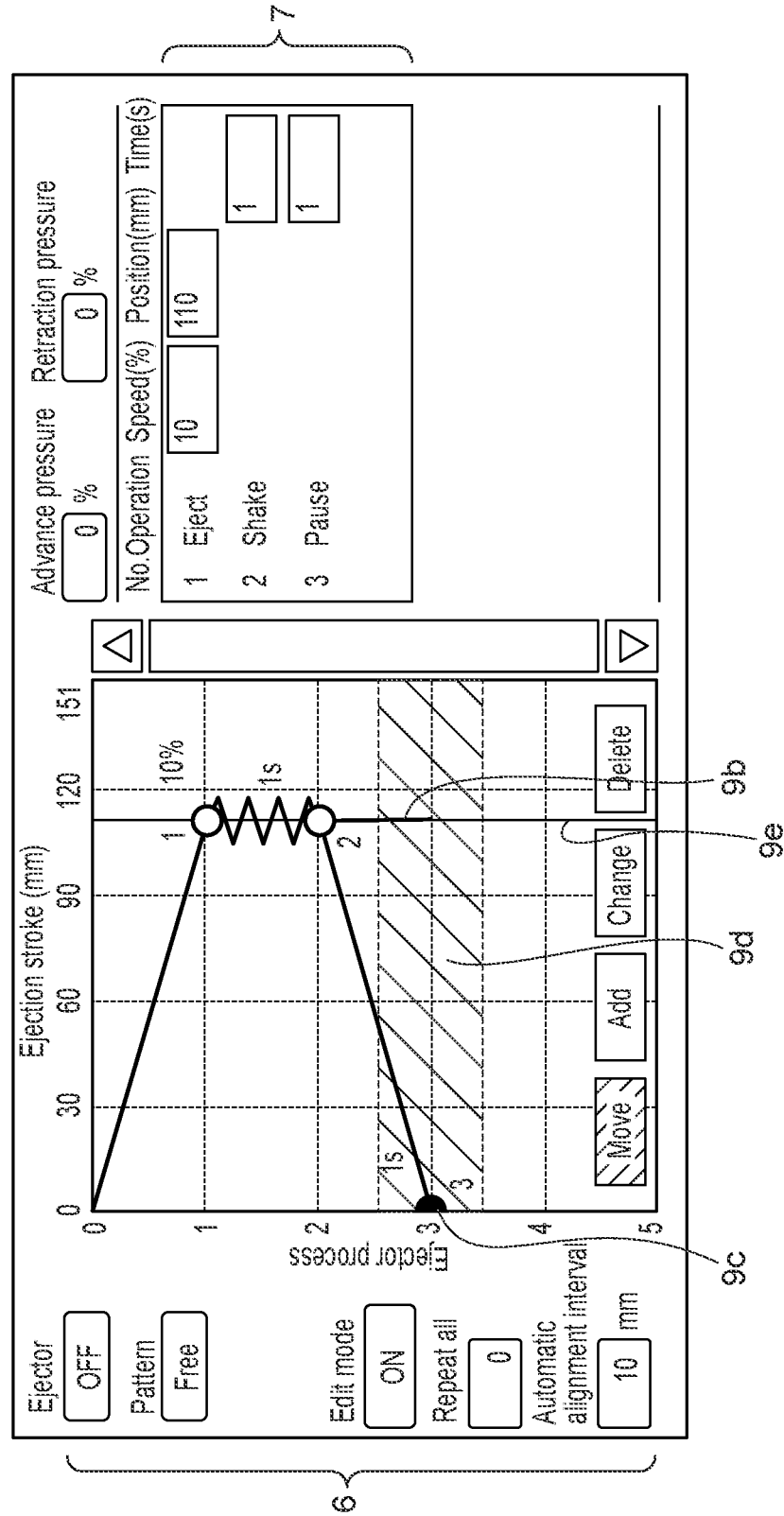
FIGS. 9A and 9B are examples of a display screen in operation settings (Part 6).

FIG. 9A is an example in which process 3 is changed from "Pause" to "Eject." First, the plot of process 3 is touched to change to the plot 9c subject to a change operation, and the "Move" button is touched to display the change input band 9d in process 3. Then, another position in the change input band 9d is touched to set a new position. In the example of FIG. 9A, process 3 is changed from the 110-mm point of an ejection stroke to a 0-mm point of an ejection stroke. In this state, the operation pattern in the graph 9 and the operation display in the numerical value display part 7 in process 3 differ, and thus the adjustment line 9b is generated from the plot of process 2. To make this adjustment line 9b disappear, the "Move" button is touched and turned OFF, and subsequently the "Change" button is touched twice to change from the "Pause" state to the "Eject" state and match the operation pattern of process 3 with the numerical value display part 7. By doing so, as illustrated in FIG. 9B, the adjustment line 9b can be made to disappear, and the numerical value display part 7 displays "Eject," a speed of 0%, and a position of 0 mm, matching the graph 9.

Figure 9B:
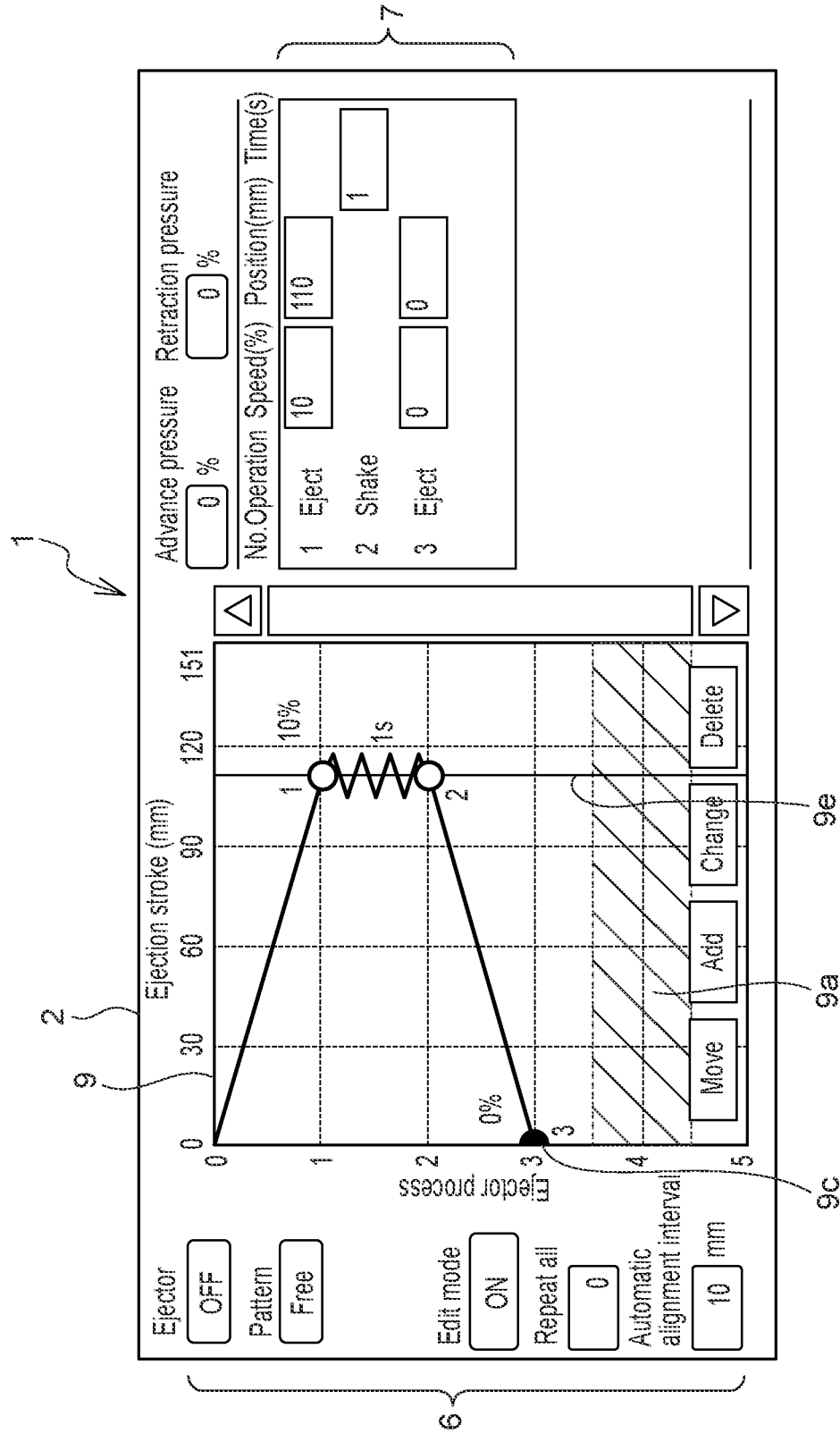
Figure 10A:
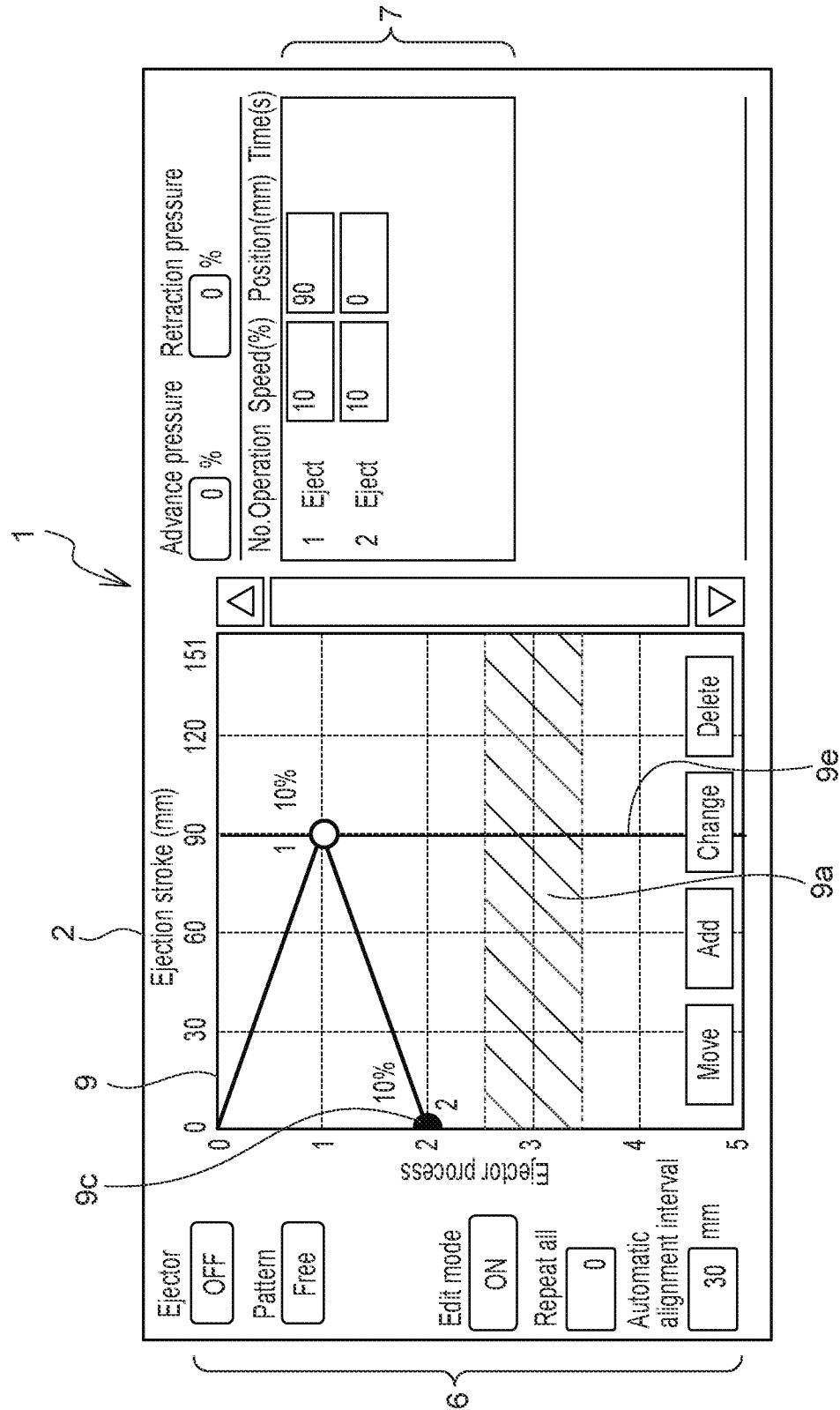
FIGS. 10A and 10B are examples of a display screen in operation settings (Part 7).

FIG. 10A is a graph showing an operation pattern in which process 2 of FIG. 9B is deleted. In the state of FIG. 9B, when the plot of process 2 is touched and changed to the plot 9c subject to a change operation and, in that state, "Delete" is touched, the selected process 2 is deleted, each process is moved forward one, and process 3 becomes process 2.

Figure 10B:
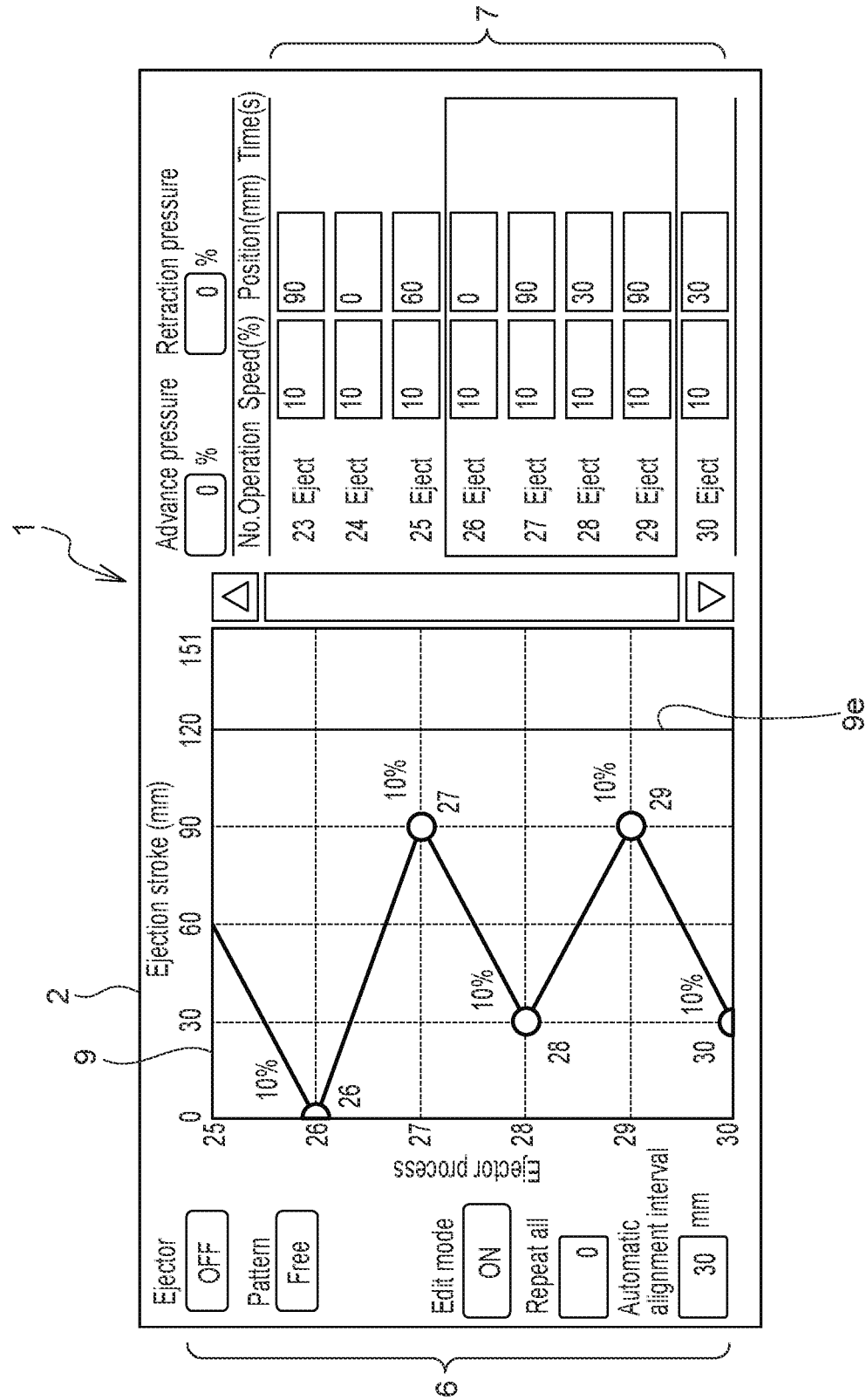

FIG. 10B illustrates the number of processes that can be displayed in the graph 9 when the edit mode is ON. The number of processes displayable can be changed by settings, but in this example, a maximum of five processes can be displayed. When the edit mode is OFF, all set processes can be displayed enlarged or reduced in accordance with the size of the graph 9. In the example of FIG. 10B, 30 processes are set with the edit mode ON, but the five processes of processes 26 to 30 are displayed on the graph of the setting display screen 2. By operating the scroll bar, the numerical value display part 7 is also scrolled together with the graph 9. In the numerical value display part 7, an operation parameter group corresponding to the plots displayed in the graph 9 can be displayed surrounded by a black frame.

Figure 11A:
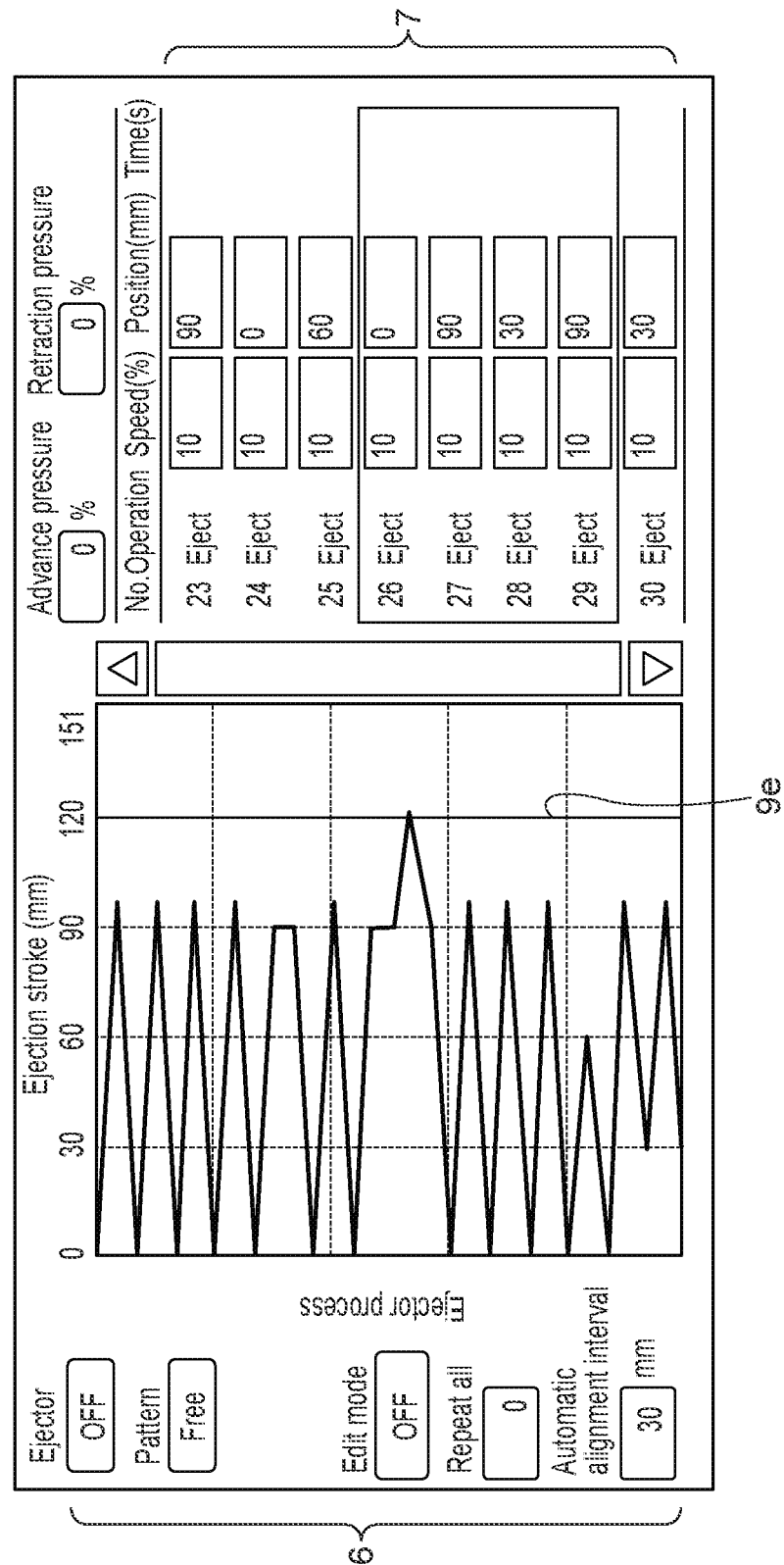
FIGS. 11A and 11B are examples of a display screen in operation settings (Part 8).

FIG. 11A is a graph when the settings are the same as those in FIG. 10B and the edit mode is OFF. When the edit mode is OFF, all processes are displayed in the graph. Therefore, the processes are displayed with a narrow pitch. On the other hand, in the numerical value display part 7, the processes are displayed in the normal display size and, in the example of FIG. 11A, the eight processes of processes 23 to 30 are displayed. It should be noted that, in operation of the scroll bar, each process in the numerical value display part 7 is scrolled, but the display of the graph 9 is not changed.

Figure 11B:
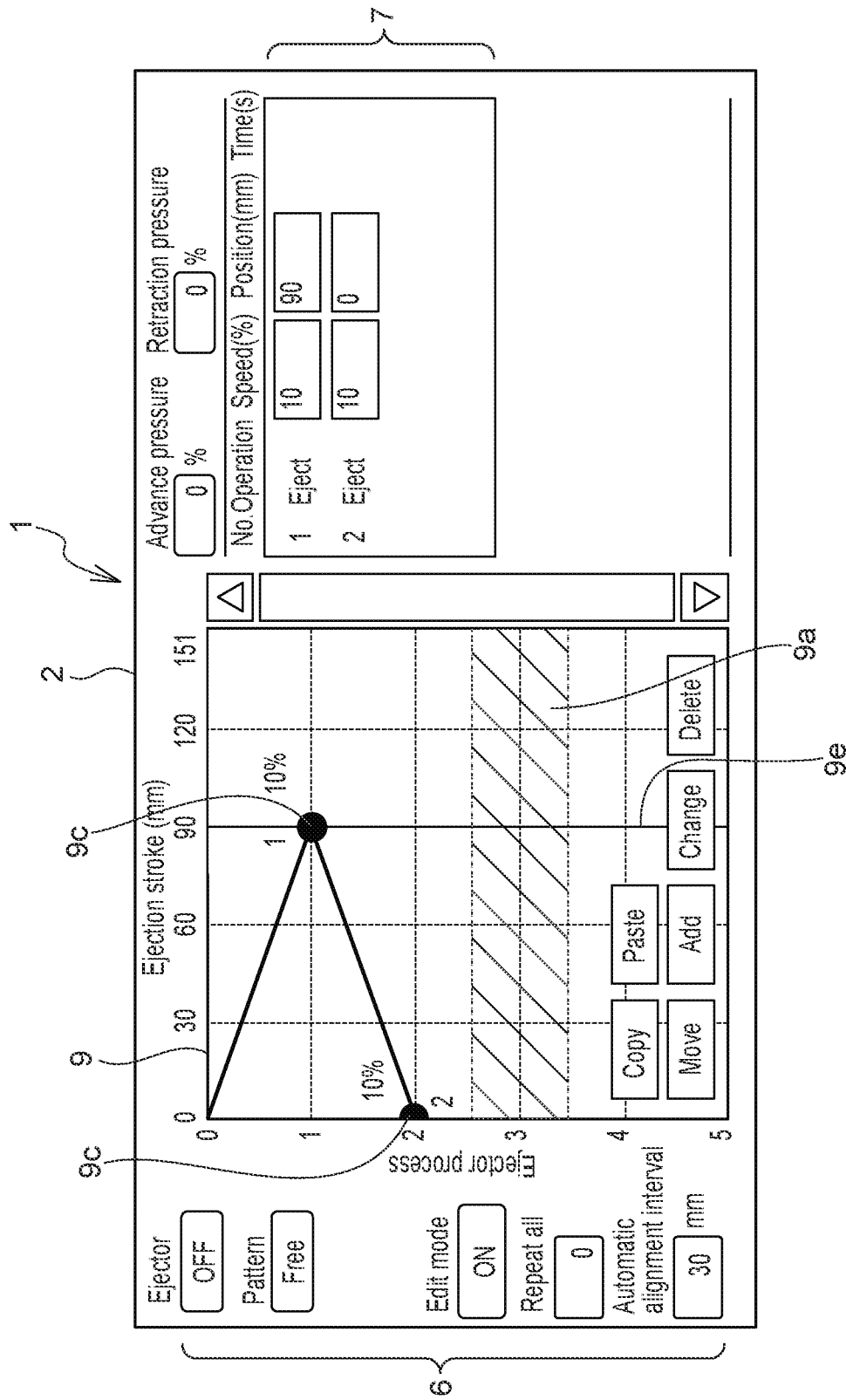

FIG. 11B is an explanatory view of a function for copying and pasting a process. When a plurality of plots are selected, a "Copy" button and a "Paste" button are displayed in the graph 9. In this state, when the "Copy" button is touched, the information of the plurality of selected plots is stored in internal memory and, by selecting a specific plot again and then touching the "Paste" button, it is possible to insert the plot group stored in the internal memory at the position of the process following the selected plot. In the example of FIG. 11B, process 1 and process 2 can be pasted as process 3 and process 4 as illustrated in FIG. 12A by selecting the two plots of processes 1 and 2 to change the plots to the plots 9c subject to a change operation, touching the displayed "Copy" button, touching the plots 9c subject to a change operation of process 2, and subsequently touching the "Paste" button. The operation parameters of the added processes 3 and 4 are displayed in the numerical value display part 7 as well.

Figure 12B:
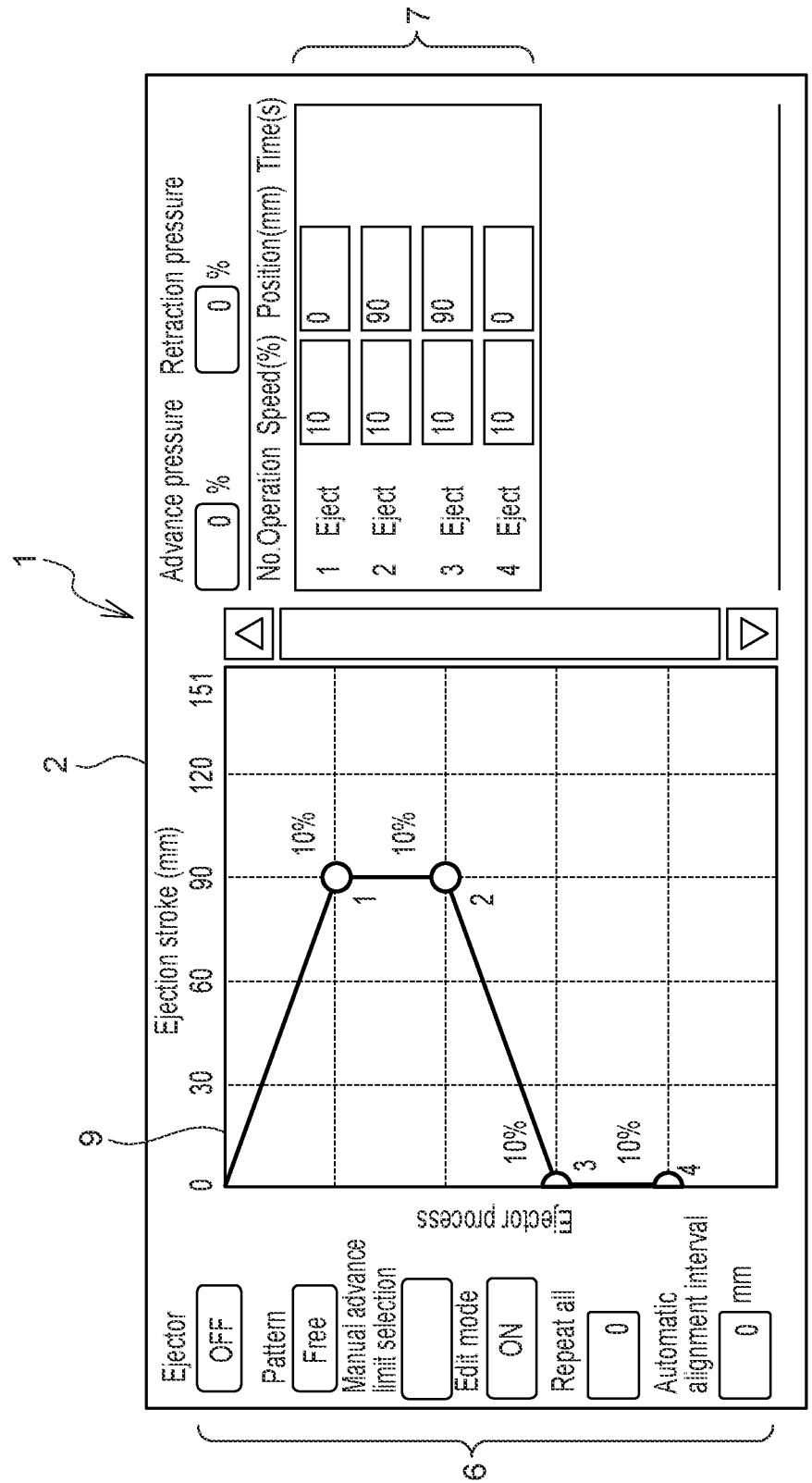

As illustrated in FIG. 12B, process 1 and process 2 illustrated in FIG. 11B is added after process 1 to set as process 2 and process 3 and process 2 before this addition is changed to process 4 by selecting the two plots of processes 1 and 2 to change the plots to the plots 9c subject to a change operation, touching the displayed "Copy" button, touching the plots 9c subject to a change operation of process 1, and subsequently touching the "Paste" button. By such an operation, the operation pattern illustrated in FIG. 12B can be obtained.

As another setting method, for example, an easy-to-view orange vertical line (solid line) can be displayed at a position of the process having, among all set processes, the largest operation position, for example, as illustrated in FIG. 4B, FIG. 5B, and FIGS. 6 to 11. This display means that the ejector is at the most advanced position. This way, when the ejector 40 is to be most advanced, the most advanced position is preferably displayed as a "maximum advance limit 9e" by a colored solid line on the graph 9, and a setting exceeding the maximum advance limit 9e can be prevented.

When the edit mode is turned OFF after completing all settings and the last process does not reach the retraction limit, for example, the warning message, "The mold cannot be closed because the retraction limit is not reached in the last process. Please revise the settings so that the retraction limit is reached." is preferably displayed. It should be noted that, when the retraction limit is not reached, the edit mode cannot be turned OFF. Further, when "Repeat all" is set to a numerical value of 1 or greater, all set processes are repeatedly operated as one cycle.

With such settings, use or non-use can be selected by turning the "Ejector" ON or OFF. The operation position and the operation parameters are displayed in the graph 9 of the setting display screen 2 and numerically displayed in the numerical value display part 7, making it possible to easily image the operations of the ejector 40 in the graph 9, in whole or in part, and furthermore easily confirm the numerical values in the numerical value display part 7. This setting display screen 2 is a touch panel by which necessary information can be displayed and operations can be easily performed, making it possible to easily input operations for the ejector 40. In particular, the setting display screen 2 can be operated by directly touching the graph 9, and thus can be visually set.

The setting display screen 2 includes a call function of setting tool displays such as "Move," "Add," "Change," "Delete," "Copy," and "Paste," as described above. By calling the setting tool display as needed, the operator can add a new process, change the operation of an existing process, change the target position of an existing process, and delete an existing process by simply touching the graph 9, and therefore can easily set the operation. Further, the setting display screen 2 is provided with a scroll bar, making it possible to increase settings virtually endlessly, and support any operation pattern.

(Correction of Touched Position)

The operation setting device 1 includes a correction function for correcting a point erroneously input by a touch operation, and a setter for finely modifying the correction position and the operation parameters thus input. As a result, it is possible to change the operation position in a narrow range, which is a drawback of a touch operation. The operation position and operation parameters can be finely modified with the setter, which allows direct input of numerical values. When the "automatic alignment interval" displayed in the graph 9 is set to a value of 1 or greater, a touched point can be corrected to a multiple of the automatic alignment interval. For example, when the automatic alignment interval is set to 30 mm, touching any position between 15 mm and 44 mm on the graph 9 is input as 30 mm, touching any position between 45 mm and 74 mm is input as 60 mm, and touching any position between 75 mm and 105 mm is input as 90 mm. When the automatic alignment interval is 0, correction is not performed and the value rounded to the first decimal place is input, which is the input limit of the injection molding machine.

(Preview)

Figure 13A:
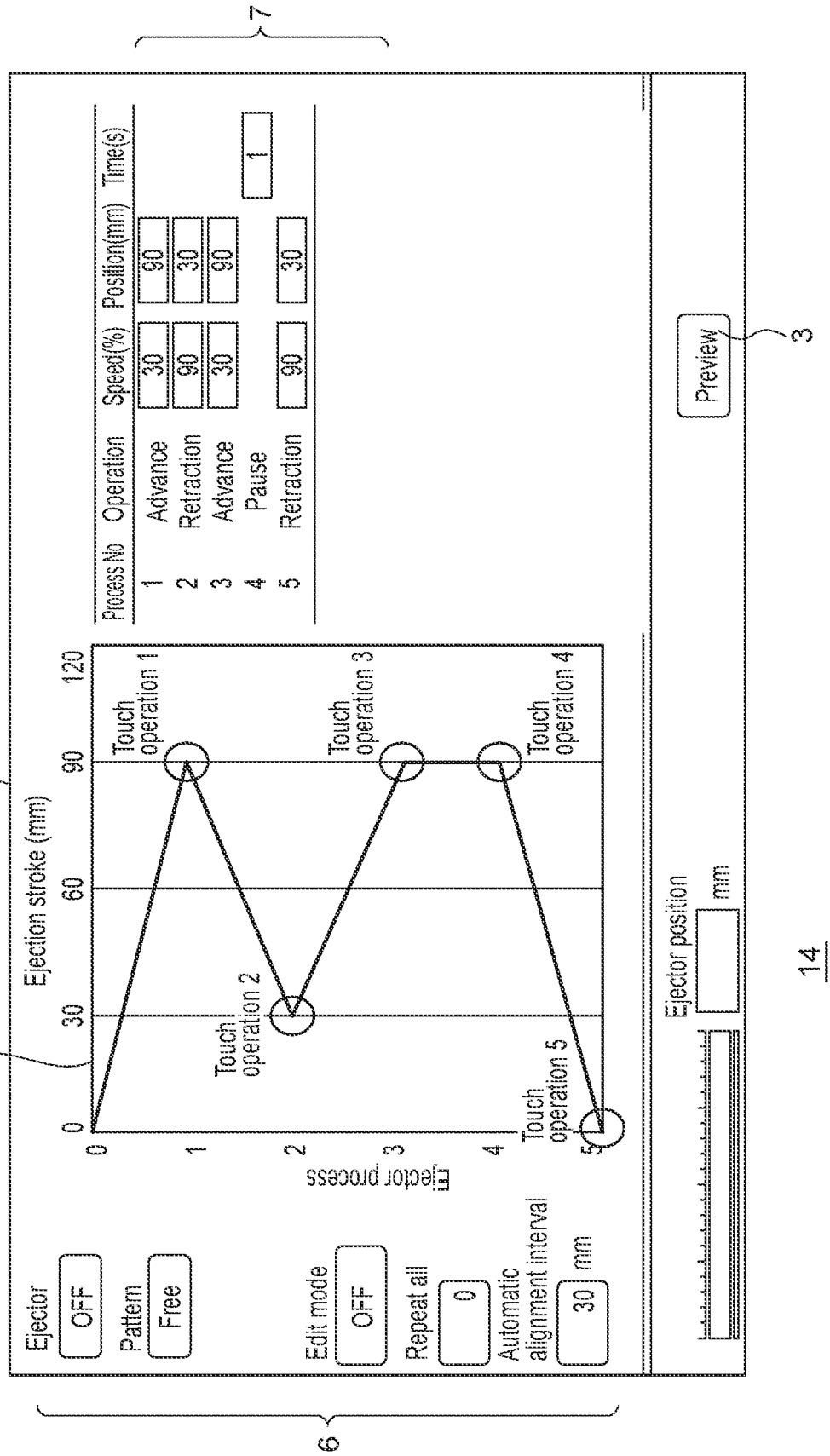

As illustrated in FIGS. 13A and 13B, it is desirable that the operation setting device 1 includes a preview function for previewing the operations of the ejector 40, in whole or in part. A preview display screen 4 for this preview can be displayed by touching the preview button 3. By previewing the operations of the ejector 40, it is possible to visually confirm the operations displayed on the setting display screen 2 and easily confirm whether or not there is a setting error or the like. By touching the preview button 3 at the lower right of the setting display screen 2 illustrated in FIG. 3A, the preview display screen 4 is displayed in the mode illustrated in FIG. 13B. This still image may be a two-dimensional image or a three-dimensional image. The displayed preview display screen 4 includes a play button 5. By touching the play button 5, it is possible to play back the operations of the ejector 40 as a moving image. When the play button 5 is touched again, the operations of the ejector 40 can be played back again.

To make it easier to confirm the operations to be played back, it is desirable that a playback speed of any operation is set to 100%, and the playback speed of the other operations is slowed down with respect to the operation having the 100% playback speed. In this way, the playback speed of a fast operation is set to 100%, making the playback speed of the other operations slower and easy to view and the operations easy to confirm. Here, "100%" is the upper-limit playback speed that can be followed by the eye during playback and, by setting, among the operations of the object, the fastest operation or a fast operation that is not the fastest but is a main operation to 100%, the other operations can be relatively slowed down.

At the time of playback, preferably a gauge 8 is displayed on the preview display screen 4. In this way, the position or the like of an operation can be confirmed using the displayed gauge 8. A scale width of the gauge 8 can be changed on the screen. The gauge 8 is preferably displayed on the same screen as the preview display screen 4, and the position of an operation can be easily confirmed.

(Control Device)

FIG. 14 is a schematic system diagram of the control device 51 that controls the operation setting device 1. The control device 51 is not limited to the example of FIG. 14 as long as configured to be capable of controlling the operation setting device 1. The control device 51 is mainly constituted by a central processing unit (CPU) 121, a chipset 123, an internal memory 125, and the like. The chipset 123 is connected to the CPU 121 via an internal bus 122. A bus line 124 that uses a local bus such as a peripheral component interconnect (PCI) bus is connected to the chipset 123 to constitute a human machine interface (HMI) control system. The internal memory 125 including various memories such as random-access memory (RAM) and read-only memory (ROM) is connected to the bus line 124. Furthermore, a display device 100 is connected to the bus line 124 via a display interface 126, and a driver 128 that reads and writes to an external memory 129 composed of a storage medium such as a memory card is connected to the bus line 124 via an input/output interface 127. In this case, the display device 100 includes a display Fd to which a touch panel Ft is attached.

A bus line 131 similar to the bus line 124 is connected to the chipset 123 to constitute a programmable logic controller (PLC) control system. An input/output interface 133 that assigns switching data Di of a switch or the like to the CPU 121 and assigns control command data Do obtained from the CPU 121 to corresponding actuators is connected to the bus line 131, and an input/output interface 135 that carries out analog-digital conversion on and assigns detection signals Si of various sensors to the CPU 121 and assigns control signals So obtained by digital-analog conversion of control command data obtained from the CPU 121 to corresponding actuators is connected to the bus line 131. As a result, a predetermined feedback control system and an open loop control system are configured.

The internal memory 125 stores a PLC program and an HMI program as well as various processing programs. It should be noted that the PLC program is software for realizing the sequence operations of various functions in the ejector device, monitoring, and the like, and the HMI program is software for realizing the setting and display of operation parameters of the ejector 40, the display of monitoring data of ejector operations, and the like.

Based on such an example of the control device 51, the operation setting device 1 according to the present invention can be controlled to display the preview display screen 4. According to the operation setting device 1, the operations of various settings of ejector operations are played back and displayed on the preview display screen 4, making it possible to simulate operations before actually operating the ejector 40 and prevent damage to the mold and the like caused by an ejector operation setting error.

In the control device 51 provided with the setting display screen 2 of a touch panel type, it is possible to display the graph 9 showing the relationship between the operation sequence and positions of the ejector 40, and set the operation positions by touching desired points in the graph 9. Based on the input information, it is possible to set the operations and operation positions of the ejector 40, and draw the graph 9 and display all ejector processes in the numerical value display part 7. By performing this operation a required number of times, it is possible to set the operations of the ejector 40 having various operation patterns. Further, the operation parameters displayed in the graph 9 can be managed as molding conditions.

Descriptions of Reference Numerals

1 Operation setting device
2 Setting display screen
3 Preview button
4 Preview display screen
5 Play button
6 Setting item button group
7 Numerical value display part
8 Scale display
9 Graph
9*a* Touch input band
9*b* Adjustment line
9*c* Plot subject to change operation (color changed)
9*d* Change input band
9*e* Maximum advance limit 10 Injection molding machine
11 Machine base
12 Injection device
13 Mold clamping device
14 Display device
17 Heating cylinder
18 Hopper
19 Injection cylinder
20 Cover
21 Mold
21a Fixed mold
21b Movable mold
22 Tie bar
23 Toggle link
24 Crosshead
25 Mold clamping drive part
29 Safety door
30 Cover
40 Ejector
41 Ejector base
42 Ejector rod
51 Control device
100 Display device
121 CPU
122 Internal bus
123 Chipset
124 Bus line
125 Internal memory
126 Display interface
127 Input/output interface
128 Driver
129 External memory
131 Bus line
133 Input/output interface
135 Input/output interface
Ft Touch panel
Fd Display

What is claimed is:

1. An operation setting device for setting operations of an ejector for extracting a molded product from a mold, the operation setting device comprising:
a touch panel display screen that has 1) a first area where an ejector operation graph is to be displayed and 2) a second area where numerical values related to the ejector operation graph is to be displayed, the ejector operation graph including a vertical axis and a horizontal axis for indicating an operation sequence and operation positions of the ejector; and
a processor programmed to:
display an input area to overlap a first portion corresponding to a first process of the operation sequence in the first area of the touch panel display screen, wherein no operation positions for the first process is displayed in the first portion;
receive via the input area displayed over the first portion corresponding to the first process of the operation sequence, a first operator input of a first operation position of the operation positions to assign the first operation position to the first process;
upon receiving the first operator input of the first operation position for the first process, 1) stop displaying the input area over the first portion and 2) display the input area to overlap a second portion corresponding to a second process of the operation sequence in the first area of the touch panel display screen, wherein no operation positions for the second process is displayed in the second portion;
receive, via the input area displayed over the second portion corresponding to the second process of the operation sequence, a second operator input of a second operation position of the operation positions to assign the second operation position to the second process;
detect the operation sequence and the operation positions of the ejector based on the received first operator input of the first operation position for the first process and the received second operator input of the second operation position for the second process to generate operation parameters each including an operation speed, an operation position, an operation time, and an operation pattern of the ejector; and
control, based on the generated operation parameters, the touch panel display screen to generate the ejector operation graph showing the operation sequence and the operation positions of the ejector along the vertical axis and the horizontal axis in the first area, and display the numerical values related to the ejector operation graph in the second area,
wherein the ejector operation graph is drawn before the ejector is actuated to extract the molded product from the mold based on the operation parameters.

2. The operation setting device according to claim 1, wherein the touch panel display screen includes a touch panel for executing the operation parameters thus set.

3. The operation setting device according to claim 1, wherein the processor is further programmed to:
correct a point in the first area erroneously touched by an operator; and
modify the operation parameters based on the corrected point.

4. The operation setting device according to claim 1, further comprising a memory to store the ejector operation graph.

5. The operation setting device according to claim 1, wherein the ejector operation graph of the first area and a numerical value display part of the second area are linked.

6. The operation setting device according to claim 1, wherein the processor is further programmed to have an edit mode for editing the operation positions and the operation parameters, one of the operation positions or a location of the operation parameters to be edited being displayed in the input area when the edit mode is switched to ON.

7. The operation setting device according to claim 1, wherein
a maximum advance limit is displayed in color in the ejector operation graph when the ejector is advanced.

8. The operation setting device according to claim 1, the processor is further programmed to perform a function for copying and pasting the operation position and the operation parameters displayed in the ejector operation graph.

9. The operation setting device according to claim 1, wherein the processor is further programmed to perform a preview function for previewing an operation image displayed on the touch panel display screen.

10. The operation setting device according to claim 1, wherein, while the input area being displayed over the second portion corresponding to the second process of the operation sequence, the processor receives, via the second area, a third operator input for adjusting the first operation position that is already assigned for the first process.

11. The operation setting device according to claim 1, wherein, when the processor receives a third operator input for adjusting the second operation position that is already assigned to the second process, the process 1) stops displaying the input area in the first area and 2) displays a change input area to overlap the second portion corresponding to the second process of the operation sequence in the first area of the touch panel display screen, wherein the second operation position that is already assigned to the second process is displayed in the second portion, and wherein the change input area is visually different from the input area.

12. An injection molding machine comprising the operation setting device according to claim 1.

* * * * *